(12) United States Patent
Kresge et al.

(10) Patent No.: US 12,534,011 B1
(45) Date of Patent: Jan. 27, 2026

(54) AUTOMATIC WHEEL GRID

(71) Applicant: Oshkosh Corporation, Oshkosh, WI (US)

(72) Inventors: Bradley S. Kresge, Jefferson, MD (US); Todd Werner, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 352 days.

(21) Appl. No.: 18/317,662

(22) Filed: May 15, 2023

Related U.S. Application Data

(60) Provisional application No. 63/413,301, filed on Oct. 5, 2022, provisional application No. 63/342,516, filed on May 16, 2022.

(51) Int. Cl.
*B60P 3/12* (2006.01)
(52) U.S. Cl.
CPC .................................. *B60P 3/125* (2013.01)
(58) Field of Classification Search
CPC ...................................................... B60P 3/125
See application file for complete search history.

(56) References Cited

U.S. PATENT DOCUMENTS

| | | | |
|---|---|---|---|
| 3,620,393 A | 11/1971 | Leslie | |
| 3,716,152 A | 2/1973 | Sloter | |
| 3,762,585 A | 10/1973 | Hobbs | |
| 4,010,858 A | 3/1977 | Mahnke, Jr. | |
| 4,323,328 A | 4/1982 | Walsh, III | |
| 4,564,207 A | 1/1986 | Russ et al. | |
| 4,611,968 A * | 9/1986 | Casteel | B60P 3/125 280/402 |
| 4,859,134 A * | 8/1989 | Lock | B60P 3/125 280/402 |
| 5,236,214 A * | 8/1993 | Taylor | B60D 1/44 280/479.2 |
| 5,350,271 A | 9/1994 | Weller | |
| 5,352,083 A * | 10/1994 | Roberts | B60P 3/125 280/402 |
| 5,628,609 A * | 5/1997 | Nespor | F16B 7/105 280/402 |
| 5,692,871 A | 12/1997 | Nespor | |
| 5,909,996 A * | 6/1999 | Cowell | B60P 3/125 414/428 |
| 6,315,515 B1 | 11/2001 | Young et al. | |

(Continued)

FOREIGN PATENT DOCUMENTS

EP 2 660 102 A1 11/2013

*Primary Examiner* — Mark C Hageman
(74) *Attorney, Agent, or Firm* — FOLEY & LARDNER LLP

(57) ABSTRACT

A wheel grid includes a crossbar configured to be coupled to a main boom of a wheel lift tow vehicle and a first L-arm rotatably coupled to the crossbar at a first pivot point. The first L-arm includes a first extension member and a first wheel brace member. The first wheel brace member is configured to engage a first tire of a towed vehicle when the first L-arm is in an engaged position. The wheel grid further includes a first crossbar end coupled to a first side of the crossbar. The first L-arm is configured to rotate from the engaged position into a stowed position in which the first wheel brace member contacts and displaces the first crossbar end.

16 Claims, 40 Drawing Sheets

(56) References Cited

U.S. PATENT DOCUMENTS

| | | | |
|---|---|---|---|
| 7,494,313 B2* | 2/2009 | Craze | B60P 3/125 |
| | | | 414/563 |
| 7,556,468 B2 | 7/2009 | Grata | |
| 2004/0081542 A1* | 4/2004 | Nolasco | B60P 3/125 |
| | | | 414/563 |
| 2004/0156706 A1 | 8/2004 | Weller et al. | |
| 2006/0045707 A1* | 3/2006 | Nolasco | B60P 3/125 |
| | | | 414/563 |

* cited by examiner

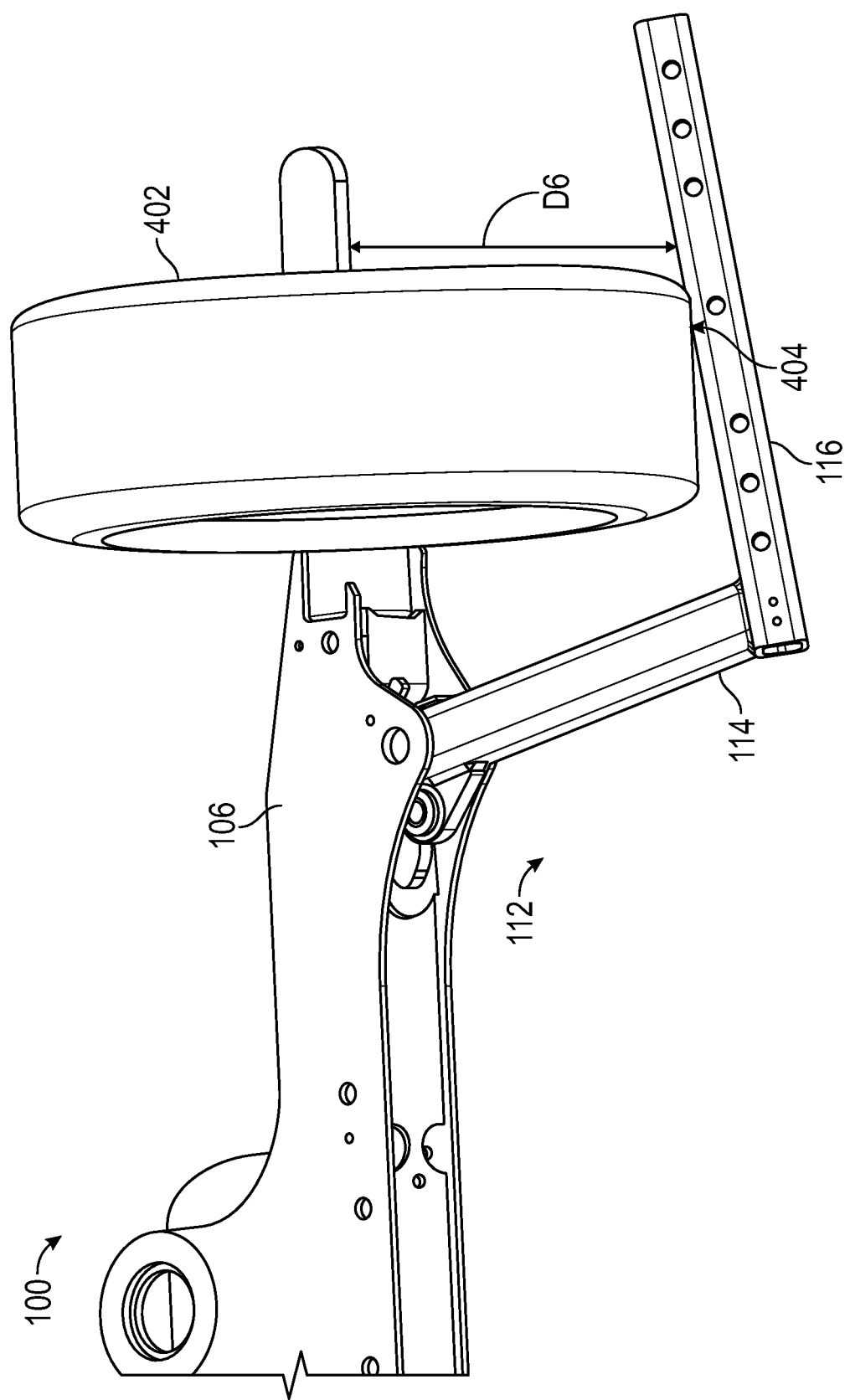

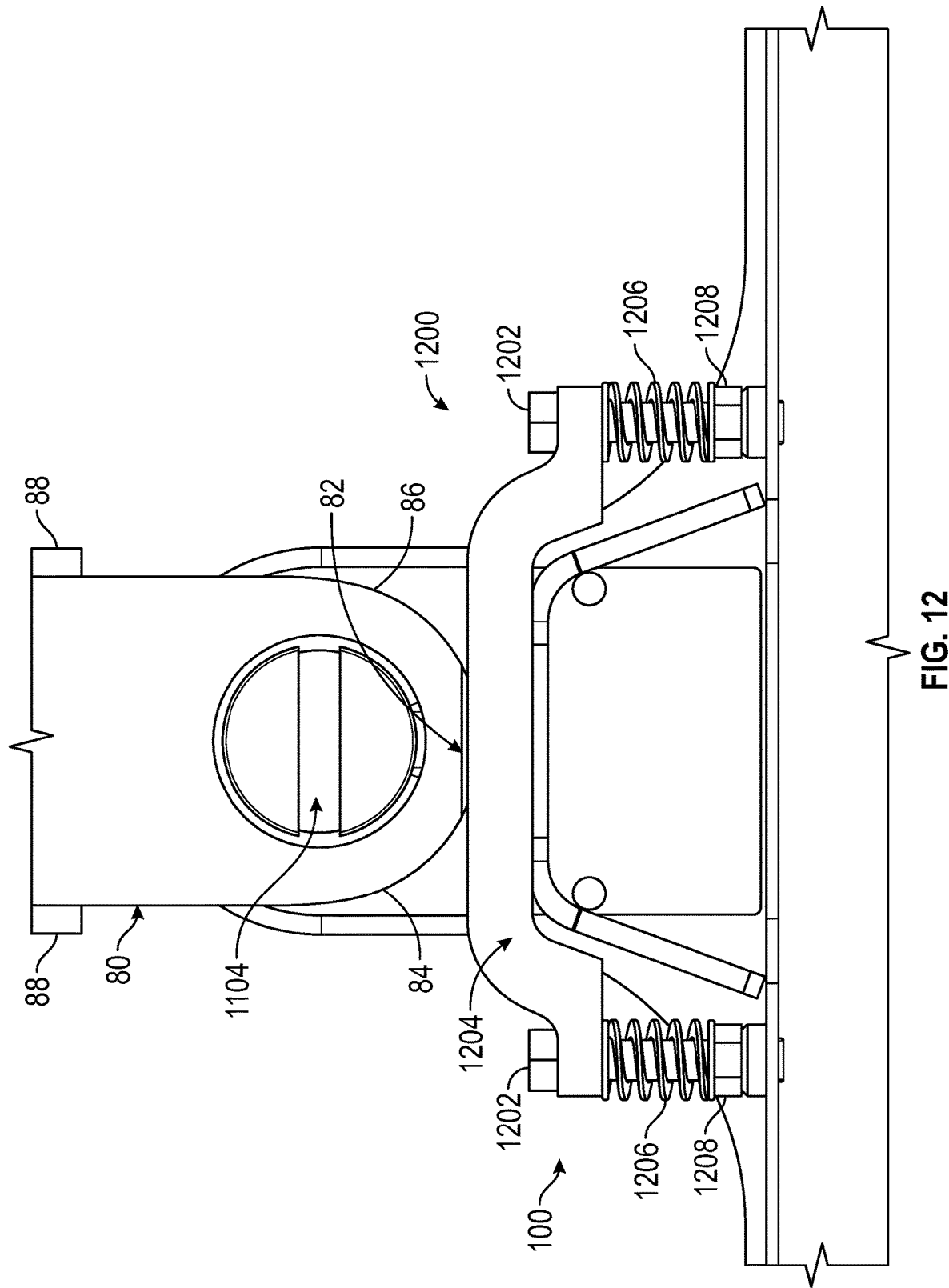

AUTOMATIC WHEEL GRID

CROSS-REFERENCE TO RELATED PATENT APPLICATIONS

This Application claims the benefit of and priority to U.S. Provisional Patent Application No. 63/413,301, filed on Oct. 5, 2022, and U.S. Provisional Patent Application No. 63/342,516, filed on May 16, 2022, both of which are hereby incorporated by reference herein in their entireties.

BACKGROUND

The present disclosure relates generally to vehicle towing. More specifically, the present disclosure relates to an automatic wheel grid capable of supporting a wide range of track widths and tire sizes.

SUMMARY

One embodiment relates to a wheel grid including a crossbar configured to be coupled to a main boom of a wheel lift tow vehicle and a first L-arm rotatably coupled to the crossbar at a first pivot point. The first L-arm includes a first extension member and a first wheel brace member. The first wheel brace member is configured to engage a first tire of a towed vehicle when the first L-arm is in an engaged position. The wheel grid further includes a first crossbar end coupled to a first side of the crossbar. The first L-arm is configured to rotate from the engaged position into a stowed position in which the first wheel brace member contacts and displaces the first crossbar end.

Another embodiment relates to a wheel grid including a crossbar configured to be coupled to a tow vehicle, a wheel engagement member rotatably coupled to the crossbar, and a wheel support coupled to the crossbar. The wheel support and the wheel engagement member are configured to cooperatively engage a tire of a towed vehicle when the wheel engagement member is in a first position. The wheel engagement member is configured to rotate from the first position into a second position, the rotation causing the wheel support to move from a third position to a fourth position.

Another embodiment relates to a wheel grid including a crossbar configured to be coupled to a main boom of a wheel lift tow vehicle, a first crossbar end removably coupled to a first side of the crossbar and configured to engage a first tire of a towed vehicle, a first extension member rotatably coupled to the crossbar at a first pivot point. The first extension member is configured to rotate from a stowed position, in which the first extension member is substantially parallel to and adjacent the crossbar, to an engaged position in which the first extension member extends substantially perpendicularly from the crossbar. The wheel grid further includes a first wheel brace member removably coupled to and extending substantially perpendicularly from the first extension member.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 4 is a perspective view the wheel grid of FIG. 1 engaging a tire of a vehicle.

FIG. 12 is a plan view of an interface between a main boom and the wheel grid of FIG. 1, according to an exemplary embodiment.

DETAILED DESCRIPTION

Figure 1:
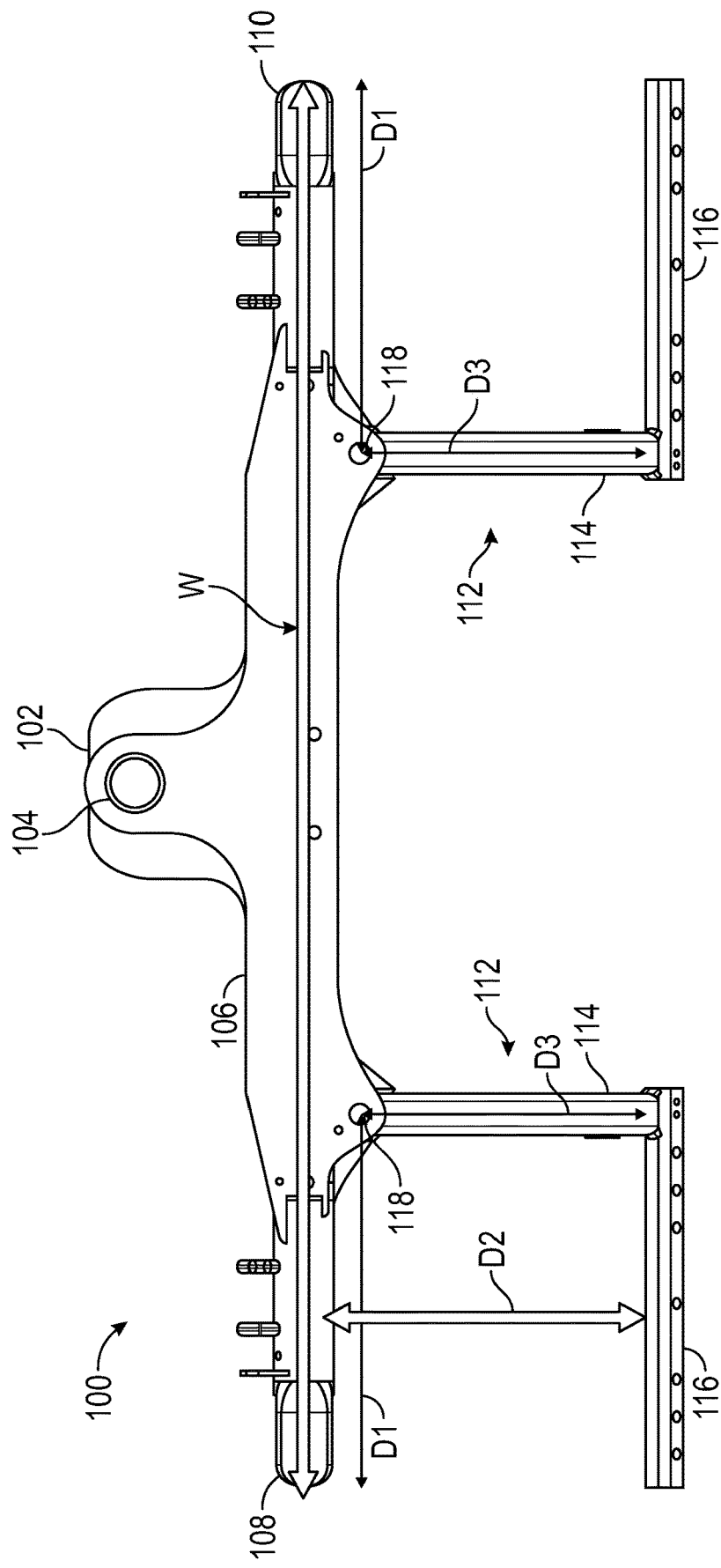
FIG. 1 is a plan view of a wheel grid, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

A wheel grid is a device that can be mounted to a tow vehicle to enable towing of another vehicle. The wheel grid is configured to lift the front or rear wheels of the towed vehicle off the ground by engaging the respective front or rear tires of the towed vehicle. This is generally preferable to using a hook to engage the frame of the vehicle, which may cause damage to the towed vehicle or may be more difficult due to the design of the towed vehicle. For the purpose of brevity, the remainder of the present disclosure will discuss wheel grids engaging with the front tires of towed vehicles. However, it should be understood that the embodiments disclosed herein may be used to tow a vehicle by lifting the rear wheels instead.

A wheel grid is generally mounted to a main boom coupled to and extending out from the rear of the tow vehicle. The wheel grid includes a main crossbar, which is generally fixed in position and engages the front sides of the front tires. The wheel grid may include two L-arms configured to rotate from a loading position, in which the L-arms can be inserted between the front wheels of the towed vehicle, to an engaged position, in which the L-arms engage the rear sides of the front tires. The boom then lifts the wheel grid, and the front tires of the towed vehicle are lifted off the ground by the crossbar and the L-arms. Some wheel grids are designed such that the L-arms can rotate into a third, stowed position when no vehicle is being towed. In the stowed position, the L-arms are tucked underneath the tow vehicle so they do not extend beyond the rear of the tow vehicle, creating a potential safety hazard.

An additional concern when designing wheel grids is the wide range of track widths (e.g., the distance between the two front tires) and tire sizes of various vehicles that may need to be towed. For example, compact sedans generally have narrower track widths and tire sizes than full-size pickup trucks. It is advantageous that a wheel grid is able to be used to tow a wide variety of vehicle types.

According to an exemplary embodiment, a wheel grid includes a crossbar configured to be coupled to a main boom of a wheel lift tow vehicle; two L-arms, each coupled to the crossbar at a respective pivot point and including an extension member and a wheel brace member; and a crossbar end coupled to each end of the crossbar and including a cantilevered portion, the crossbar ends each configured to engage a tire of a towed vehicle. The L-arms are configured to rotate into a stowed position in which each L arm is positioned under one of the cantilevered portions.

Figure 2:
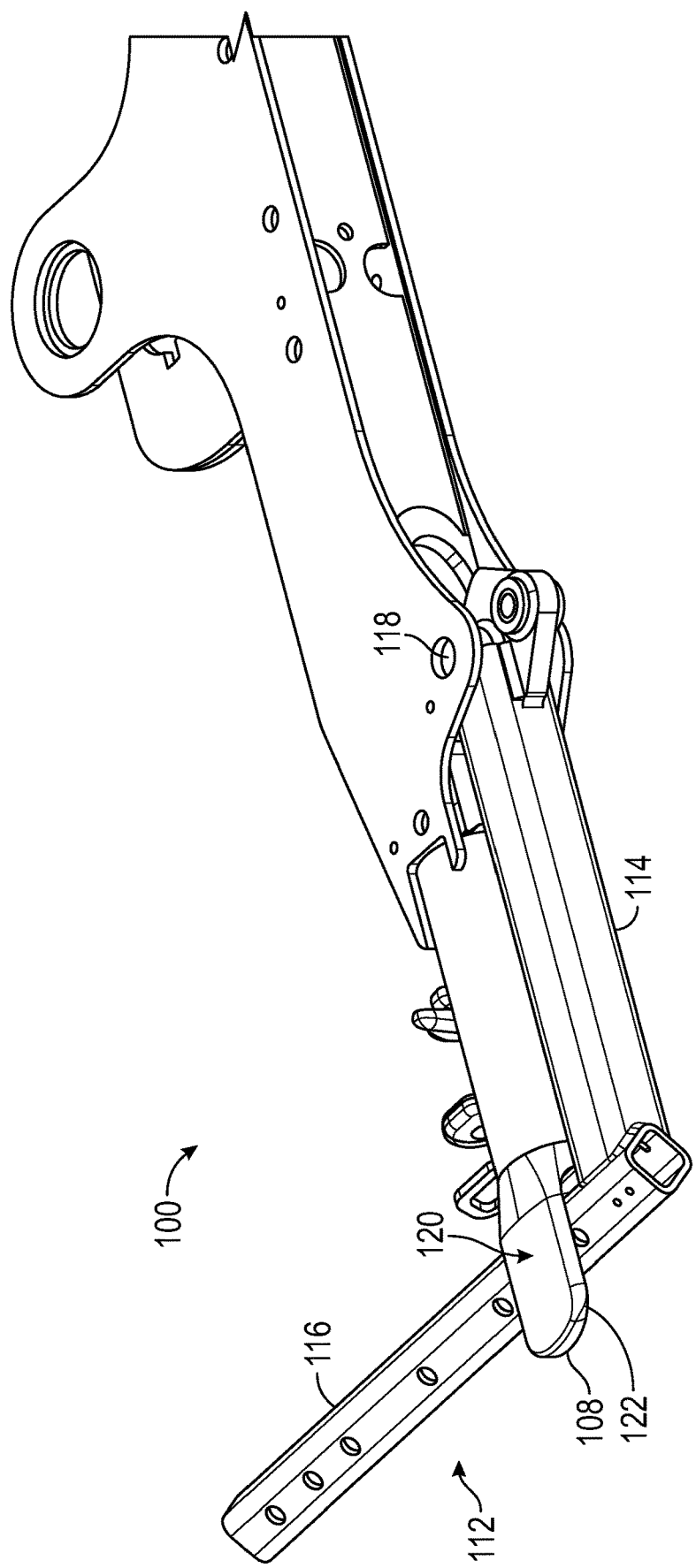
FIG. 2 is a perspective view the wheel grid of FIG. 1.

Referring now to FIGS. 1 and 2, a wheel grid 100 is shown, according to some embodiments. The wheel grid 100 includes a mounting bracket 102 including an opening 104.

The opening 104 is configured to receive a pin such that the mounting bracket 102 can be rotatably coupled to a main boom of a tow truck by the pin. The mounting bracket 102 is coupled to a crossbar 106 that extends from a left end 108 to a right end 110. The wheel grid 100 includes two L-arms 112 (e.g., wheel engagement members) for engaging the front tires of a towed vehicle. Each L-arm 112 includes an extension member 114 coupled to a wheel brace member 116. The wheel brace member 116 may be substantially straight and substantially perpendicular to the extension member 114. The L-arms 112 are rotatably coupled to the crossbar 106 at rotation points 118 (e.g., pivot points, etc.). Specifically, a proximal end of the extension member 114 is coupled to the rotation point 118 and a distal end of the extension member 114 is coupled to a proximal end of the wheel brace member 116. In FIG. 1, the wheel grid 100 is shown in an engaged position, in which the wheel grid 100 may be engaged with the tires of a towed vehicle. The crossbar 106 engages the front of the front tires of the towed vehicle, the extension members 114 extend rearward between the front tires, and the wheel brace members 116 engage the rear of the front tires. The distance from the left end 108 to the right end 110 is shown as width W. The distance from the crossbar 106 to the wheel brace members 116 is shown as distance D2.

FIG. 2 shows the wheel grid 100 in a stowed position, in which the L-arms 112 rotate approximately 90 degrees from the engaged position such that the extension members 114 are substantially parallel and adjacent to the crossbar 106 and the wheel brace members 116 extend forward underneath the tow vehicle in a direction substantially perpendicular to the crossbar 106. In conventional wheel grids, the distance from the rotation point 118 to the wheel brace member 116, shown as distance D3, may be greater than the distance from the rotation point 118 to the end 108 of the crossbar 106, shown as distance D1. In these conventional wheel grids, when the L-arms 112 rotate into the stowed position, the wheel brace members 116 may be positioned further from the center of the wheel grid 100 than the end 108 of the crossbar 106. This allows the L-arms 112 to rotate into the stowed position without the crossbar 106 interfering. However, in order to tow a wide range of vehicles, it may be advantageous to reduce the distance D2 so that the wheel grid can be used to tow vehicles with smaller tires. It is also advantageous to increase the distance D1, and more specifically, the width W of the crossbar 106, so that vehicles with wider track widths can also be towed. In order to increase the width W while decreasing the distance D1 (thereby reducing the distance D3), the wheel grid 100 includes a crossbar end 120 (e.g., a wheel support) at either end of the crossbar 106. The crossbar end 120 includes a cantilevered portion 122 that allows the wheel brace members 116 to rotate under the ends 108, 110 of the crossbar 106. Thus, according to some embodiments, the wheel grid 100 has a distance D3 from the rotation point 118 to the wheel brace member 116 that is shorter than the distance D1 from the rotation point 118 to the end 108 of the crossbar 106.

Figure 3A:
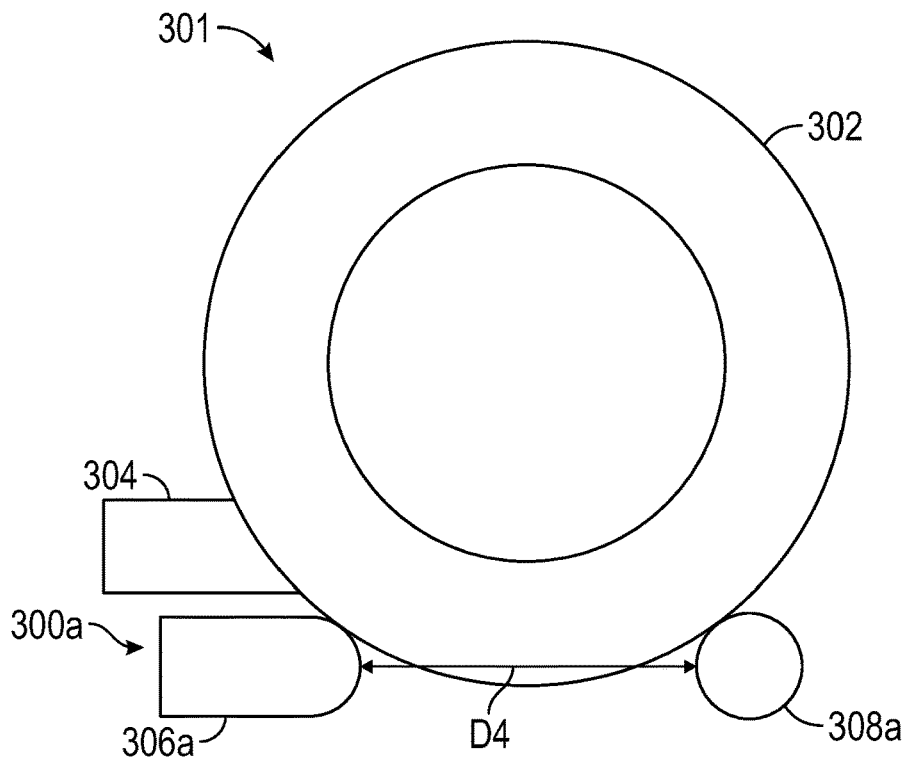
FIGS. 3A and 3B are side view diagrams of a tire being engaged by a wheel grid.
Figure 3B:
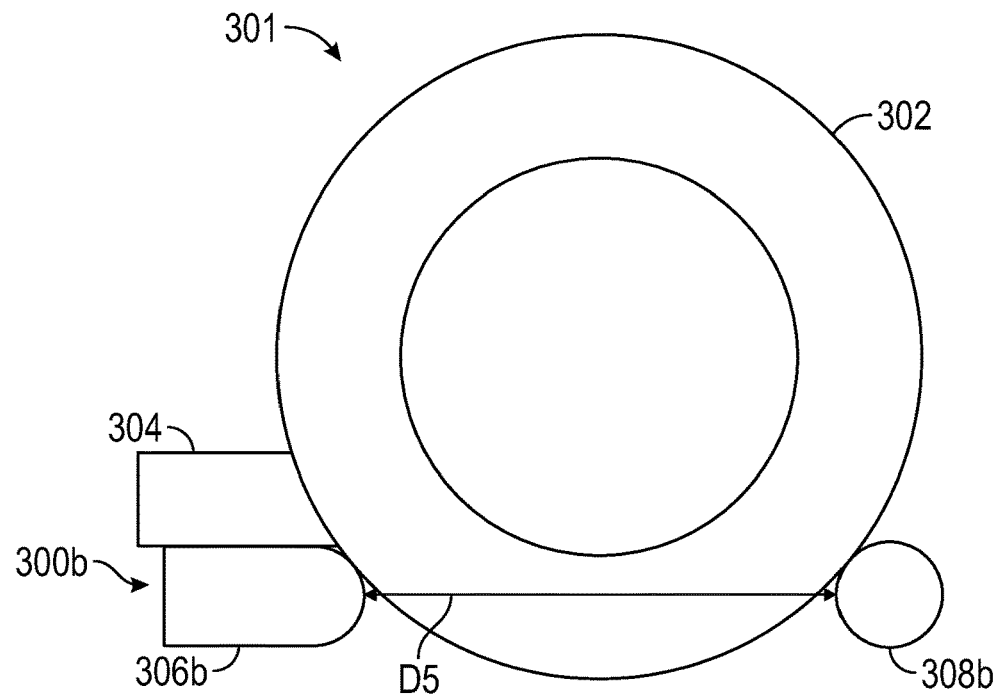

Referring now to FIGS. 3A and 3B, partial cross section views of two wheel grids 300a, 300b are shown engaging a towed vehicle 301, according to some embodiments. The wheel grid 300a includes a crossbar 306a that is a distance D4 away from a wheel brace member 308a. The wheel grid 300b includes a crossbar 306b that is a distance D5 away from a wheel brace member 308b. Distance D5 is greater than distance D4. When wheel grid 300a engages the tire 302 of the towed vehicle 300, the tire 302 sits high enough that there is clearance between the crossbar 306a and the oil pan 304 and other components of the undercarriage of the towed vehicle 301. However, because the distance D5 between the crossbar 306b and the wheel brace member 308b of the wheel grid 300b is larger, the tire 302 sits lower on the wheel grid 300b and the crossbar 306b may contact and damage the oil pan 304 and other components of the undercarriage of the towed vehicle 301. FIG. 4 shows a wheel grid 100 with an L-arm 112 that is over-rotated such that the wheel brace member 116 contacts the tire 402 of a towed vehicle at a contact point 404 near the outside of the tire 402. It should be understood that "over-rotated" refers to the rotation of the l-arm 112 such that the extension member 114 and the crossbar 106 form an angle greater than 90 degrees. The contact point 404 is a distance D6 from the crossbar 106, which is shorter than the length of the extension member 114 due to the over-rotation of the L-arm 412. This may be necessary to tow vehicles with smaller tires 402. The longer the extension member 114, the more the L-arm 112 must over-rotate to contact the tire 402 at an acceptable distance D6. If the extension member 114 is too long, the wheel brace member 116 may contact the tire 402 at a contact point 404 that is too close to the sidewall of the tire 402 or the extension member 114 may contact the sidewall of the tire 402, either of which can damage the tire 402.

Figure 5:
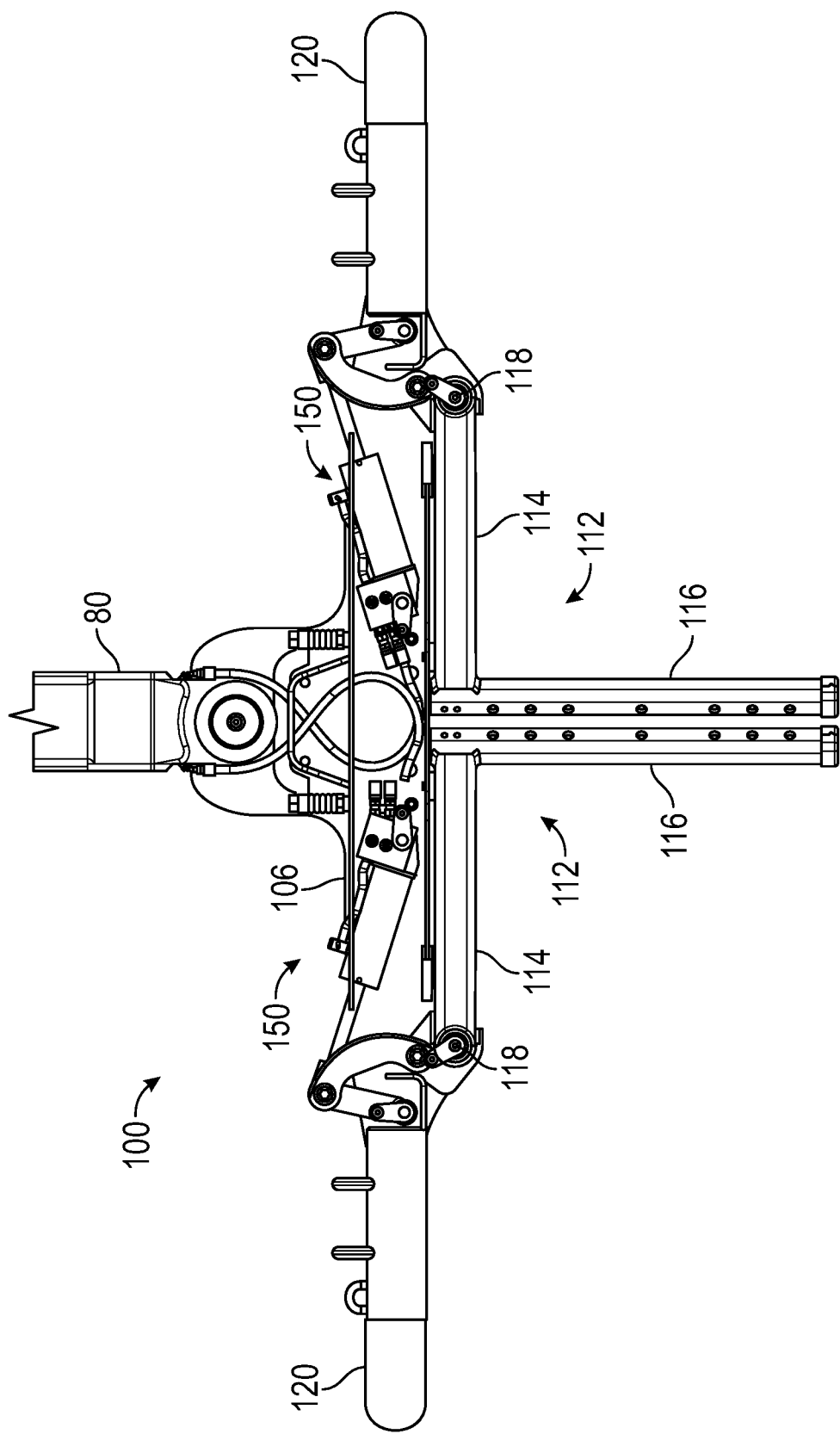
FIG. 5 is a plan view of the wheel grid of FIG. 1 in a loading position.
Figure 6:
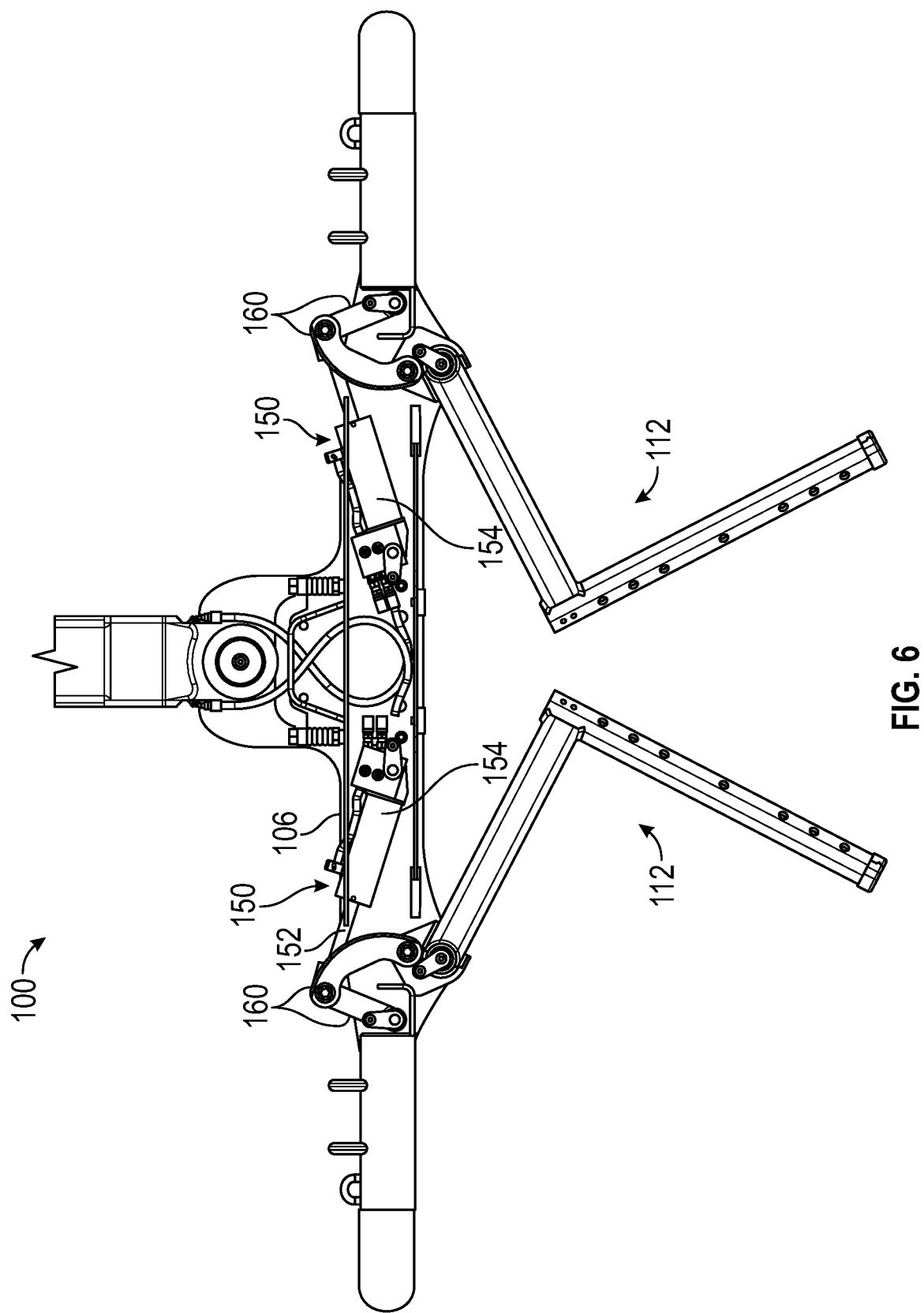
FIG. 6 is a plan view of the wheel grid of FIG. 1 transitioning from a loading position to an engaged position.

FIGS. 5-11 illustrate the wheel grid 100 with the L-arms 112 rotated into various operational positions, according to some embodiments. The wheel grid 100 is coupled to a boom 80, which may be coupled to and extend rearward from a tow vehicle. FIG. 5 shows the wheel grid 100 in the loading position, with the wheel brace members 116 are perpendicular to the crossbar 106 and extending rearward and the extension members 114 parallel and adjacent to the crossbar 106. To engage a vehicle to be towed, the tow vehicle backs up towards the towed vehicle and the wheel brace members 116 are inserted between the front wheels of the towed vehicle until the crossbar 106 contacts the towed vehicle. Linear actuators 150 are configured to rotate the L-arms 112 to move them between the loading, engaged, and stowed positions. FIG. 6 shows the wheel grid 100 with the L-arms 112 in transition between the loading position and the engaged position. The rods 152 of the linear actuators 150 retract into the cylinders 154, rotating the linkages 160 causing the L-arms 112 to rotate. The linear actuators 150 may be, for example, electromechanical actuators, pneumatic actuators, or hydraulic actuators that may be controlled via user input. In some embodiments, other actuators or configurations may be used to cause the rotation of the L-arms 112. The arrangement of the linkages 160 allows the linear actuators 150 to be substantially within the footprint of the crossbar 106 and enable at least 180-degree rotation of the L-arms 112 from the stowed position to the loading position. This, combined with the positioning of the rotation points 118, allows the extension members 114 to be substantially parallel and directly adjacent to the crossbar 106 when in the loading position. When in the loading position, the wheel brace member 116 may be substantially parallel and directly adjacent to one another. This may allow the wheel brace members 116 to more easily fit between the tires of the towed vehicle, particularly when the towed vehicle must be engaged by the wheel grid 100 at an angle. The linear actuators 150 and/or any other actuated component of the wheel grid 100 (and other wheel grid embodiments described herein) may be controlled by a controller. The controller may include computer-readable storage media storing instructions that, when executed by a processor, cause the controller to send control signals to the actuators. The instructions may further cause the controller to receive user commands from a user interface and send control signals based on the user commands. The user interface may include buttons, switches, a touchscreen, etc. A user may enter commands via the user interface to move the L-arms 112 between the loading, engaged, and stowed positions. The controller may receive the commands and send control instructions to the actuators to move the L-arms 112 into the position commanded by the user.

Figure 7:
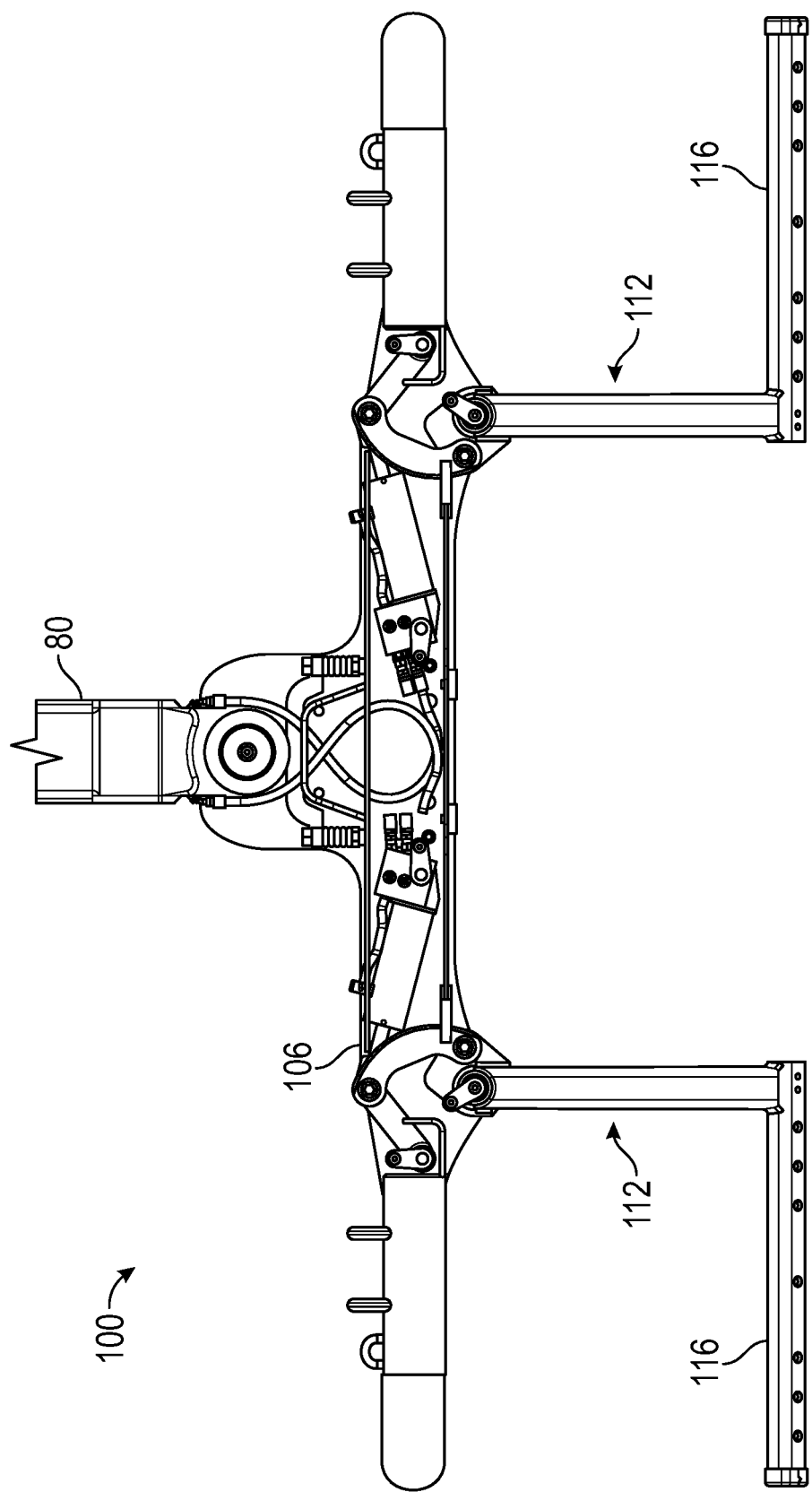
FIG. 7 is a plan view of the wheel grid of FIG. 1 in an engaged position.
Figure 8:
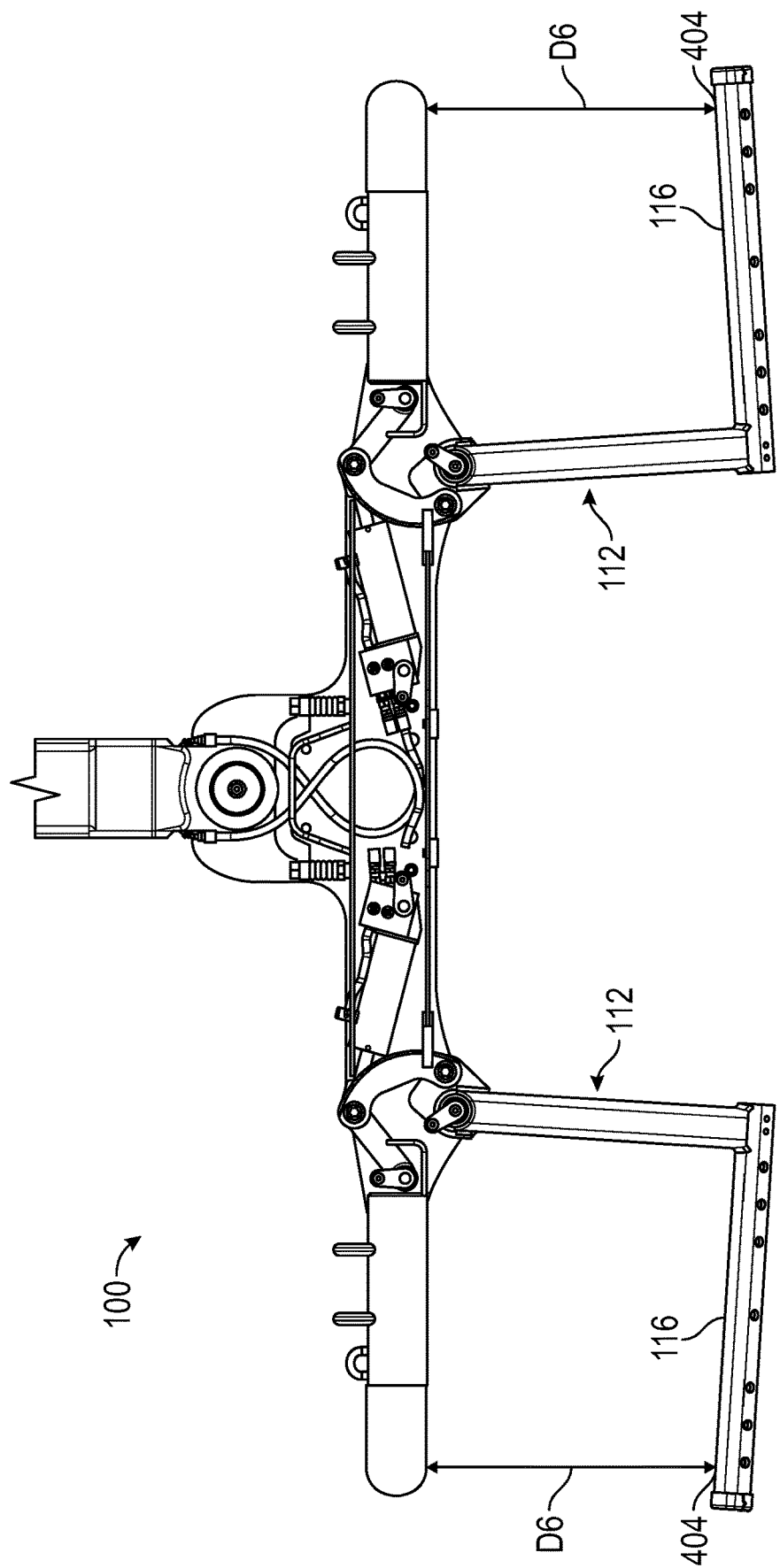
FIG. 8 is a plan view of the wheel grid of FIG. 1 in an over-rotated engaged position.
Figure 9:
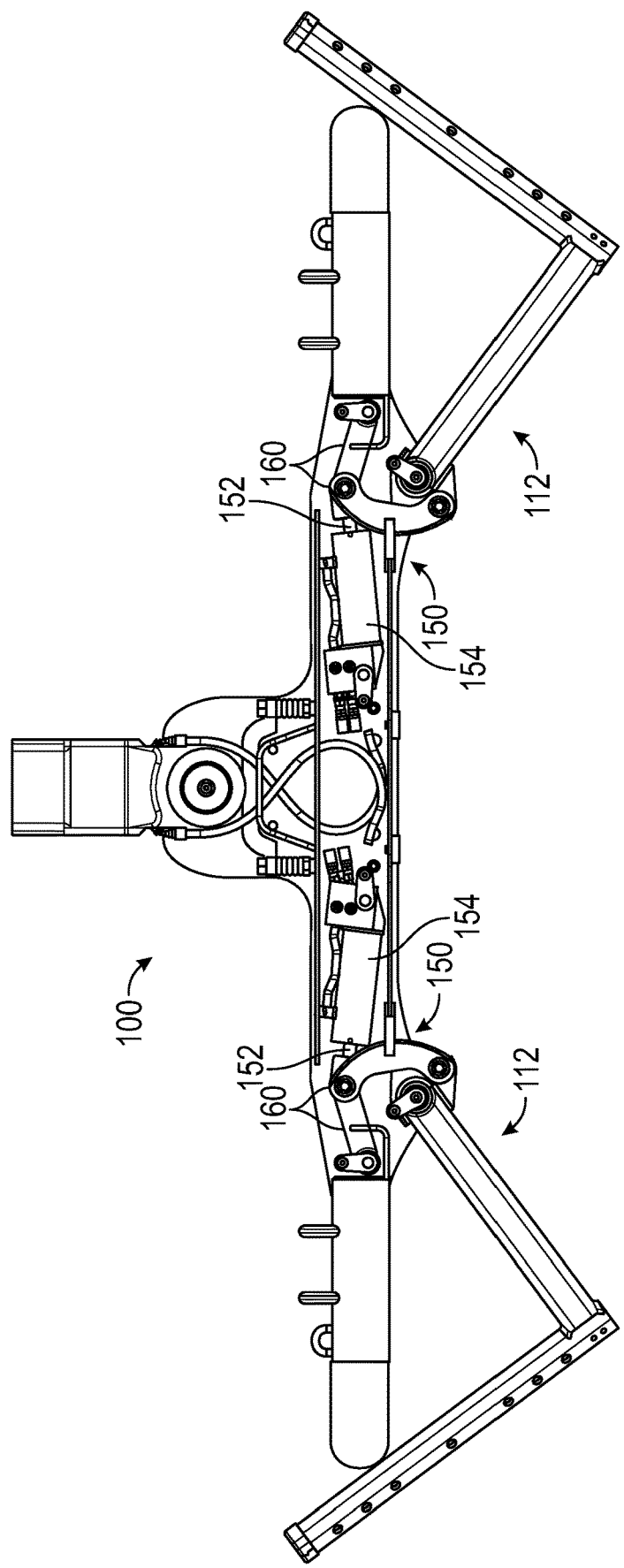
FIG. 9 is a plan view of the wheel grid of FIG. 1 transitioning from an engaged position to a stowed position.

FIG. 7 shows the wheel grid 100 with the L-arms 112 rotated into an engaged position such that the wheel brace members 116 are roughly parallel to the crossbar 106. The wheel brace members 116 may engage the rear side of the front tires of the towed vehicle. The boom 80 can then lift the wheel grid 100 causing the crossbar 106 and the wheel brace members 116 to lift the front of the towed vehicle by engaging the front tires. It should be understood that one or more of the crossbar 106 or the wheel brace members 116 may not contact the tire until the wheel grid 100 is partially lifted. FIG. 8 shows the wheel grid 100 in an over-rotated engaged position. As discussed above, for towing vehicles with smaller tires, a small amount of over-rotation may be necessary to reduce the distance D6 from the crossbar 106 to the contact point 404 of the tire on the wheel brace member 116. FIG. 9 shows the wheel grid 100 with the L-arms 112 in transition between an engaged position and a stowed position. The rods 152 of the linear actuators 150 continue to retract into the cylinders 154, rotating the linkages 160 causing the L-arms 112 to rotate further.

Figure 10:
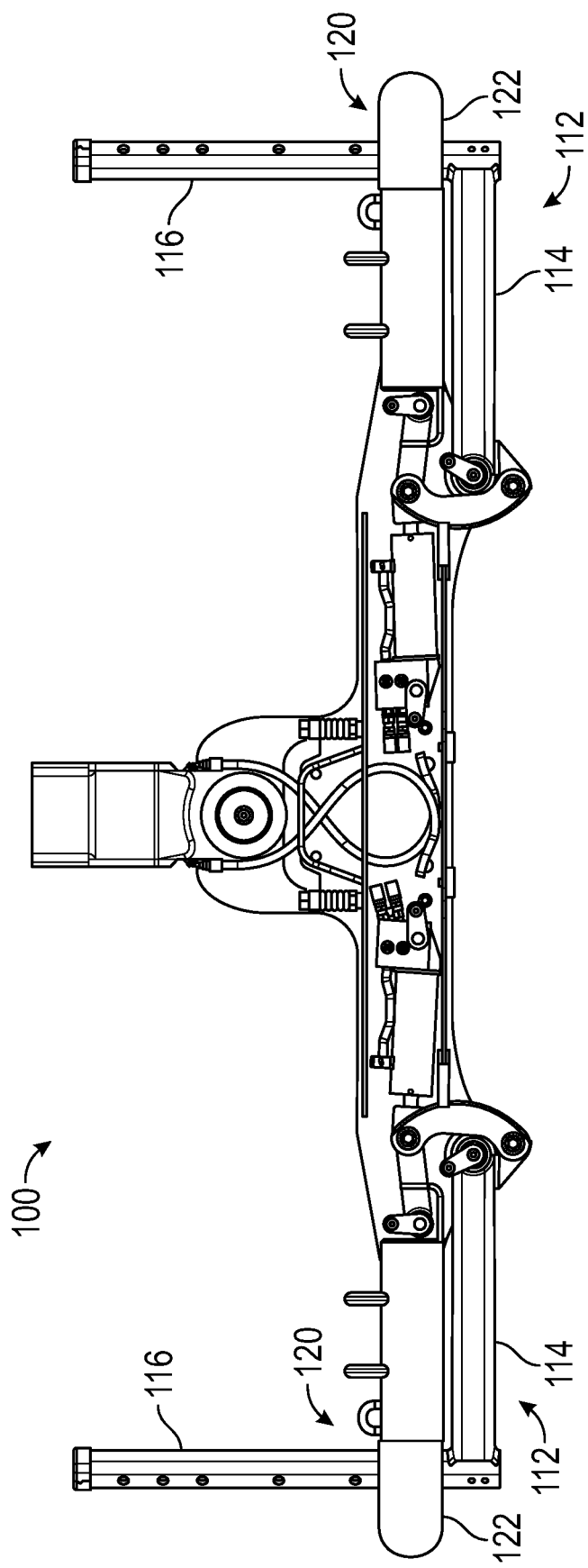
FIG. 10 is a plan view of the wheel grid of FIG. 1 in a stowed position.

FIG. 10 shows the wheel grid 100 with the L-arms 112 in a stowed position such that the extension members 114 are adjacent the crossbar 106 and the wheel brace members 116 extend forward toward the tow vehicle. The wheel brace members 116 pass under the cantilevered portions 122 of the crossbar ends 120. As discussed above, this allows the distance D3 from the crossbar 106 to the wheel brace members 116 to be reduced while maintaining the width W of the crossbar 106. Because the wheel brace members 116 pass under the cantilevered portions 122 of the crossbar ends 120, the crossbar 106 does not interfere with the rotation of the L-arms 112 into the stowed position.

Figure 11A:
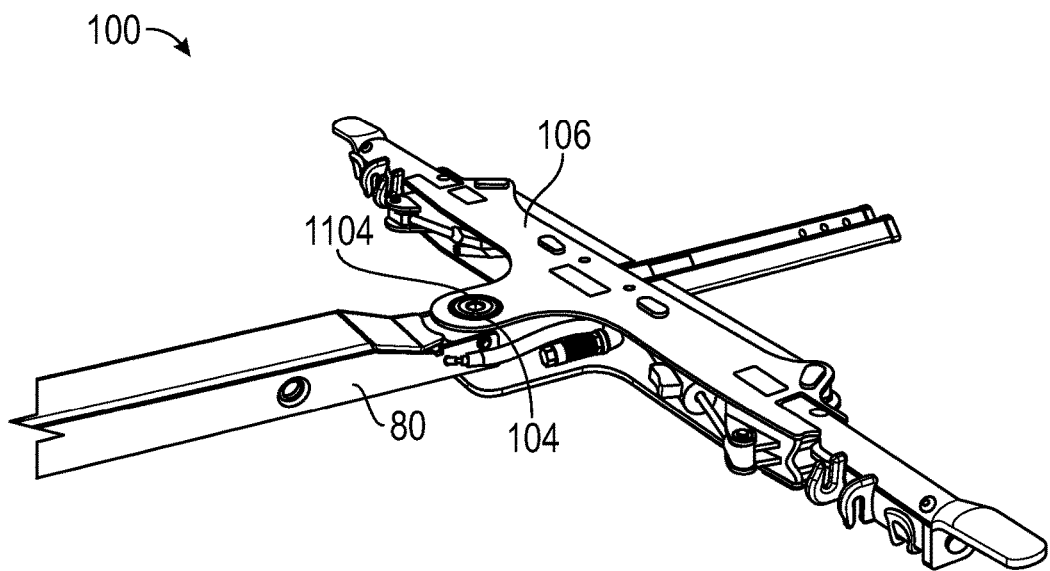
FIGS. 11A and 11B are perspective views of the wheel grid of FIG. 1.
Figure 11B:
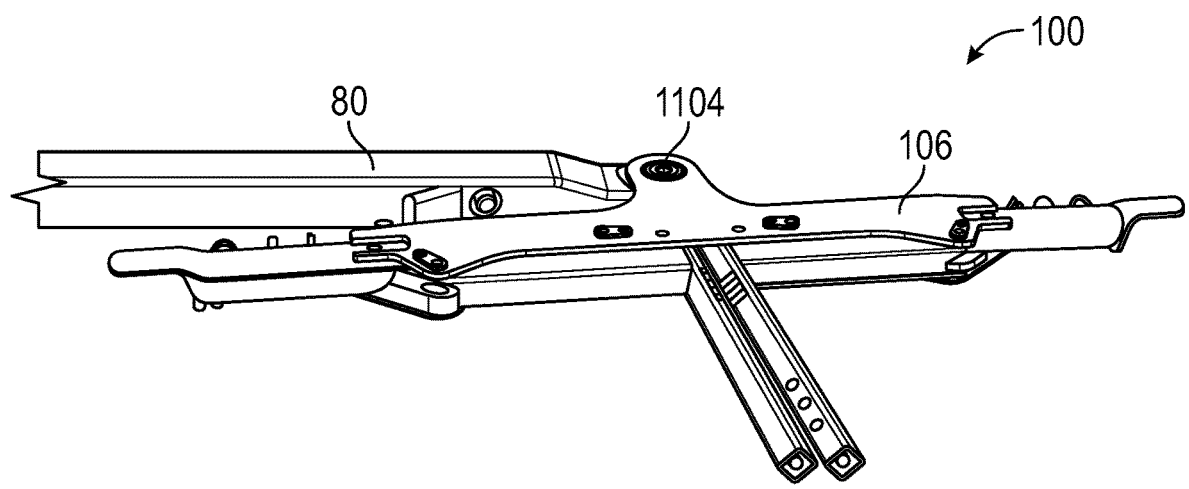

FIGS. 11A and 11B show the wheel grid 100 rotated zero degrees and ninety degrees, respectively, about a rotation pin 1104 inserted into the opening 104 in the mounting bracket 102, according to some embodiments The rotation pin 1104 rotatable couples the wheel grid 100 to the main boom 80 to allow the tow vehicle to engage the tires of a towed vehicle from an angle. For example, it may not be possible to load a car parallel parked between two other cars with the crossbar 106 in a static position perpendicular to the main boom 80. Rotation of the wheel grid 100 allows the towed car to be engaged and pulled out of the parking spot at an angle. In some embodiments, the wheel grid 100 may be inserted under the center of a parallel-parked vehicle from the side, and the crossbar 106 may engage the rear of the front tires while the wheel brace members 116 engage the front of the front tires. The towed vehicle can be pulled out of the parking spot, set back down, and reengaged from the front to be towed away. In some embodiments, the rotation of the wheel grid 100 relative to the main boom 80 may be actuated (e.g., electrically, hydraulically, or pneumatically actuated). In some embodiments, the wheel grid 100 rotates when it comes in contact with a tire of a towed vehicle. The tire pushes the wheel grid 100 left or right causing the rotation as the tow vehicle backs toward the towed vehicle. The wheel grid 100 may be able to rotate at least 90 degrees in either direction (clockwise or counterclockwise) from the neutral position in which the crossbar 106 is perpendicular to the main boom 80.

Figure 13:
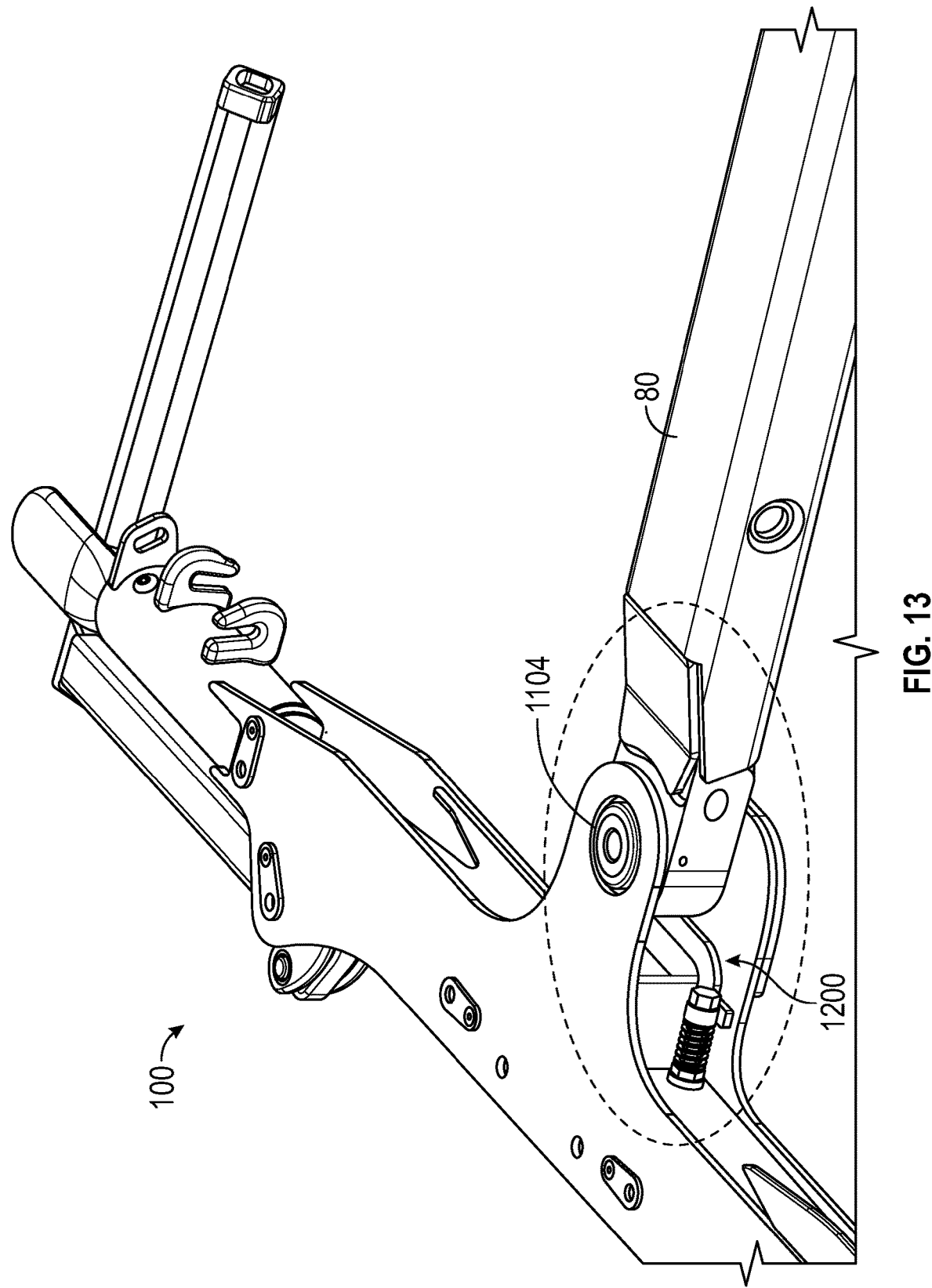
FIG. 13 is a perspective view of the interface of FIG. 12.

FIG. 12 shows a detent assembly 1200 that resists the rotation of the wheel grid 100 relative to the main boom 80, according to some embodiments. The detent assembly 1201 may be mounted to the crossbar 106 by two fasteners 1202 (e.g., threaded fasteners, screws, shoulder screws, etc.). The fasteners 1202 each extend through a respective clearance hole in a detent bracket 1204, such that the detent bracket 1204 is slidably coupled (e.g., not threadedly coupled) to the fasteners 1202. A spring 1206 is positioned around each of the fasteners 1202 and biases the detent bracket 1204 toward the main boom 80. The fasteners 1202 may be threadedly coupled to the crossbar 106, and a locknut 1208 may be threadedly coupled to each fastener 1202 to hold the fastener 1202 in position relative to the crossbar 106. When the wheel grid 100 is in the neutral position (e.g., when the crossbar 106 is perpendicular to the main boom 80), the springs 1206 bias the detent bracket 1204 such that the detent bracket 1204 engages a detent flat 82 in the main boom 80. This configuration resists the rotation of the wheel grid 100 until a rotational force on the wheel grid 100 overcomes the force of the detent assembly 1100. The towed vehicle may thus be kept substantially in line with the tow vehicle unless a relatively strong rotational force overcomes the force of the detent assembly 1100. The detent assembly 1201 may also prevent or resist the rotation of the wheel grid 100 when the wheel grid 100 is in the stowed position to stop the wheel grid 100 from swinging and potentially contacting the rear wheels or other components of the tow vehicle. The main boom 80 includes a left portion 84 and a right portion 86, each with a circular profile, which the detent bracket 1204 contacts when the wheel grid 100 is rotated out of the neutral position. FIG. 13 shows a perspective view of the detent assembly 1200.

In some embodiments, the main boom 80 may include stops 88 to limit the overall rotation of the wheel grid 100 in either direction. The stops 88 may be positioned such that the heads of the fasteners 1202 contact the stops. Fine control of the maximum amount of rotation of the wheel grid 100 can be achieved by adjusting the extension of the fasteners 1202 away from the crossbar 106. For example, the fasteners 1202 can be loosened such that the heads of the fasteners 1202 are farther from the crossbar 106. The heads of the fasteners 1202 will then contact the stops 88 on the main boom 80 at a lower amount of rotation. Conversely, the fasteners 1202 can be tightened such that the heads of the fasteners 1202 are closer to the crossbar 106, and the wheel grid 100 will be able to rotate further before the fasteners 1202 contact the stops 88.

Figure 14:
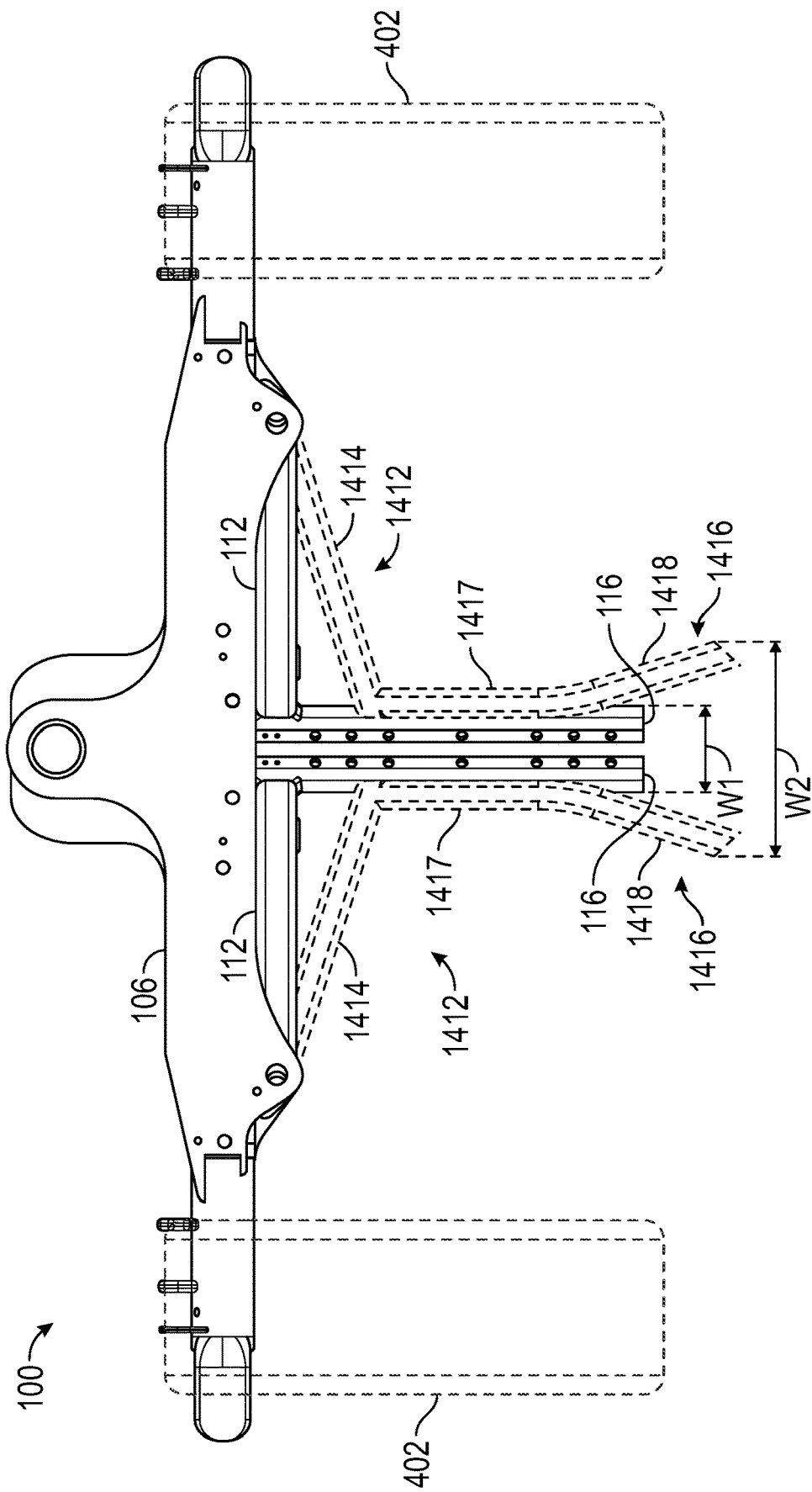
FIGS. 14-16 are plan views of the wheel grid of FIG. 1 with overlaid alternative shaped L-arms.
Figure 15:
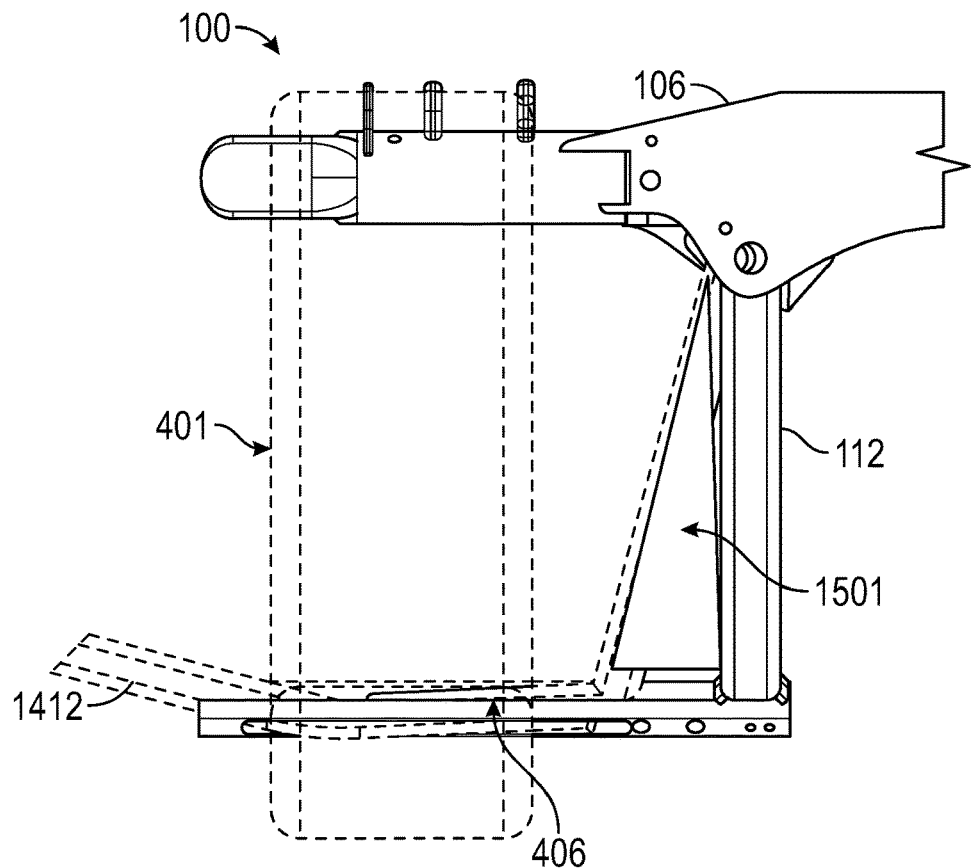
Figure 16:
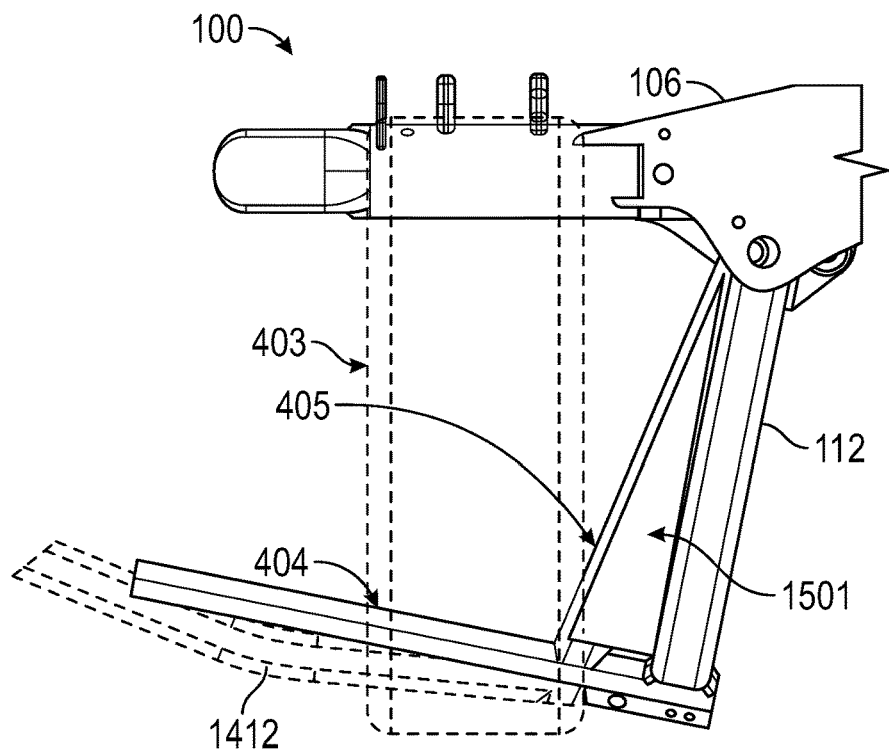

FIGS. 14-16 show the wheel grid 100 with overlaid alternatively designed L-arms 1412, to emphasize the advantages of the shape of the L-arms 112. The L-arms 1412 are designed with extension members 1414 that are not able to rotate into a parallel and adjacent position relative to the crossbar 106. The L-arms 1412 may also include wheel brace members 1416 that have a straight portion 1417 and an angled end 1418. The angled ends 1418 cause the combined width W2 of the wheel brace members 1416 in the loading position to be larger than the width W1 is the combined wheel brace members 116 in the loading position. This makes it more difficult to fit the wheel brace member 1416 between the tires of the towed vehicle. FIGS. 15 and 16 show the wheel grid 100 and the alternatively designed L-arms 1412 in a loading position engaging a large tire 401 and an over-rotated loading position engaging a small tire 403, respectively. As shown in FIG. 15, because the straight portion 1417 of the wheel brace member 1416 is not perpendicular to the extension member 1414, an area 1501 of interference is created. When engaging a towed vehicle with large tires 401, the area 1501 requires that the wheel grid is more centered on the towed vehicle. If the wheel grid is not centered, the straight portion 1417 of the wheel brace member 1416 can contact the sidewall of the tire 401. As shown in FIG. 16, when towing a vehicle with small tires 403, the straight portion 1417 of the wheel brace member 1416 may contact the sidewall of the tire 403 at a contact point 405 rather than making contact at the back of the tire at contact point 404. To avoid contact at the contact point 405, the L-arms 1412 cannot over-rotate as much as the L-arms 112, which causes a towed vehicle with small tires 403 to drop lower into the wheel grid, potentially causing contact between the wheel grid and the undercarriage of the towed vehicle. Thus, in the case of a small tire 403 or a large tire 401, the L-arms 112 provide advantages over the alternatively designed L-arms 1412.

Wheel Grid with Spring-Extended Crossbar

Figure 17:
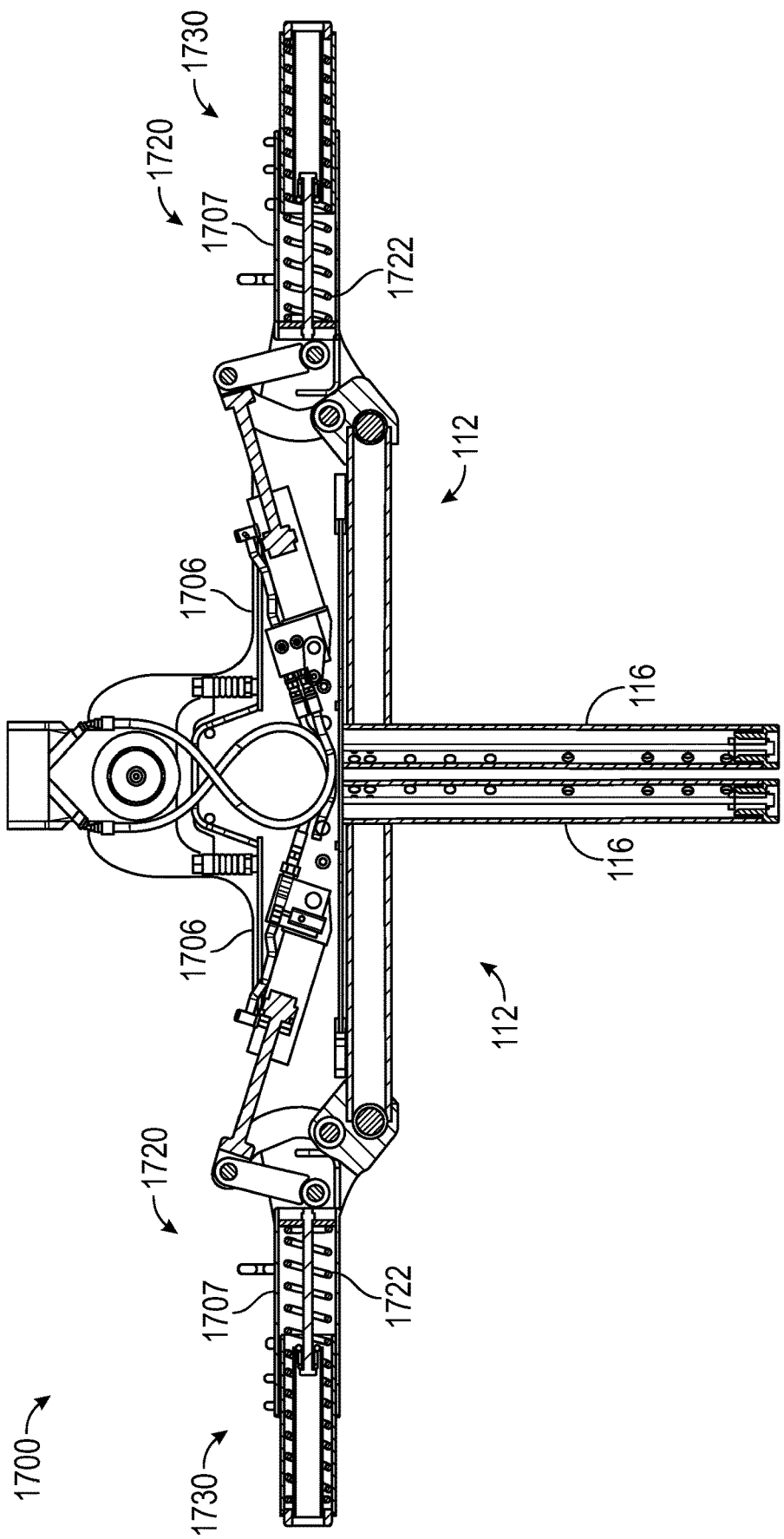
FIG. 17 is a partial section view of a wheel grid, according to an exemplary embodiment.

Referring now to FIG. 17, a wheel grid 1700 is shown, according to some embodiments. The wheel grid 1700 may be substantially similar to the wheel grid 100, except as shown and described. As discussed above, the crossbar 1706 may be configured to be coupled to a main boom of a tow vehicle. Rather than including a cantilevered portion (e.g., the cantilevered portion 122 of wheel grid 100), the wheel grid 1700 may include a spring-extended (e.g., spring-loaded, etc.) crossbar end assembly 1720. The crossbar 1706 may include a hollow cylinder 1707 (e.g., a tube) at each end. The crossbar end assembly 1720 may include a piston assembly 1730 (e.g., a crossbar end, a wheel support, etc.) that can nest inside the cylinder 1707 when the L-arms 112 are in a stowed position. A spring 1722 (e.g., a compression spring, a coil spring, a gas spring, etc.) may be positioned in the cylinder 1707 to bias the piston assembly 1730 toward an extended position away from the center of the crossbar 1706 and towards an end (e.g., a side) of the crossbar 1706. When the L-arms 112 are in the engaged position, a piston assembly 1730 and a corresponding wheel brace member 116 on each side of the wheel grid 1700 cooperatively engage a tire of a towed vehicle. The wheel grid 1700 can then lift the tires of the towed vehicle off the ground to tow the towed vehicle. As discussed above with regard to the wheel grid 100, when no towed vehicle is being engaged by the wheel grid 1700, the L-arms 112 may rotate into a stowed position, with the wheel brace members 116 pointing towards the tow vehicle and substantially perpendicular to the crossbar 1706. When the L-arms 112 rotate into the stowed position, the wheel brace members 116 contact and displace the piston assemblies 1730, pushing the piston assemblies 1730 toward the center of the crossbar into the cylinder 1707, overcoming the force of the spring 1722. In other embodiments, the piston assembly 1730 may have a larger diameter than the cylinder 1707 and may be pushed by the wheel brace member 116 such that the cylinder 1707 nests inside the piston assembly 1730. Additional embodiments in which the piston assemblies 1730 overlap a portion of the crossbar 1706 when pushed by the wheel brace members 116 are also contemplated herein. The engaged position of the L-arm 112 may be described as a first position, and the stowed position of the L-arm 112 may be described as a second position. The piston assembly 1730 may be described as being in a third position when the L-arm 112 is in the first position and the piston assembly 1730 is in the extended position and in a fourth position when the L-arm 112 is in the second position and the piston assembly 1730 is displaced and nested inside the cylinder 1707.

Figure 18:
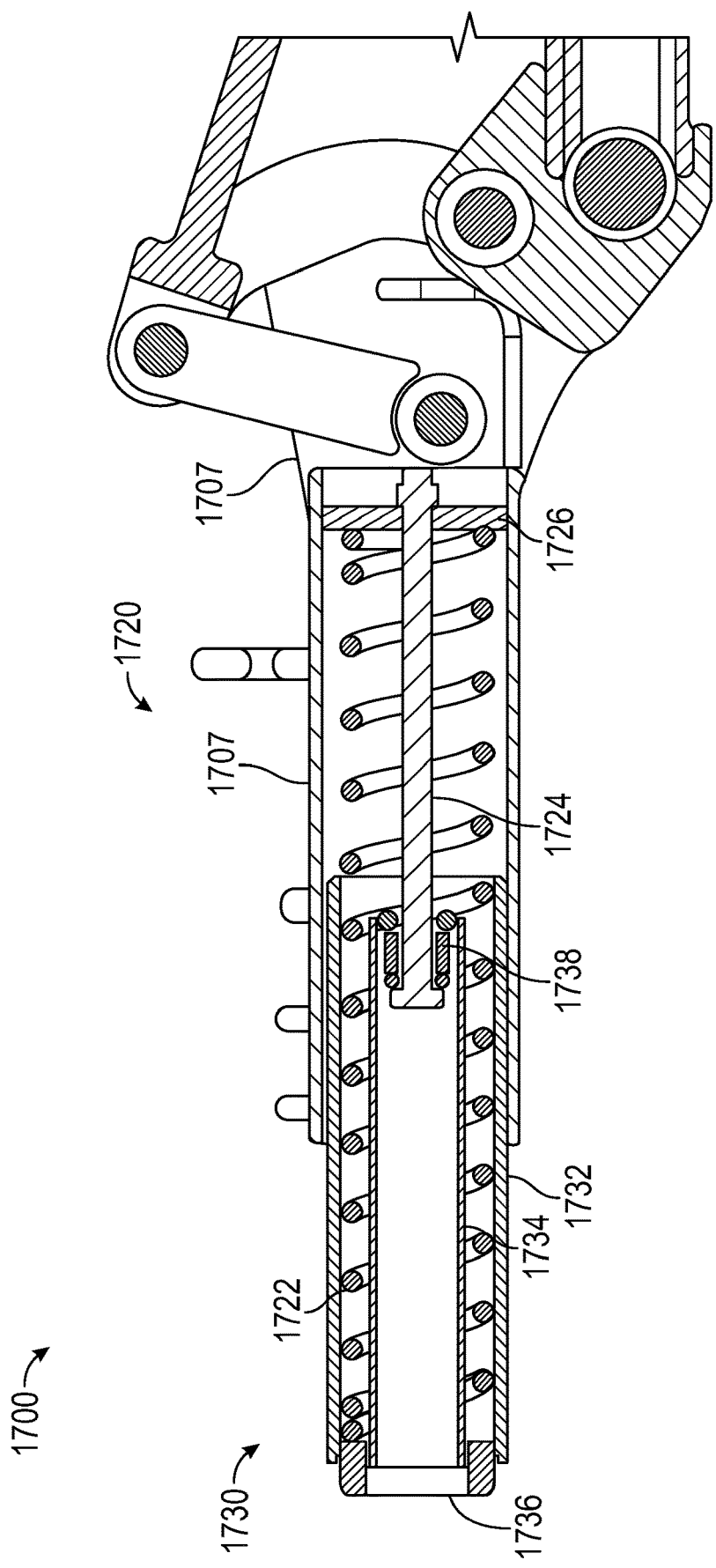
FIG. 18 is a partial section view of a crossbar end assembly of the wheel grid of FIG. 17.

FIG. 18 shows the crossbar end assembly 1720 in further detail, according to some embodiments. In some embodiments, the piston assembly 1730 includes a hollow outer cylinder 1732, a hollow inner cylinder 1734, and an end cap 1736. The spring 1722 extends through the outer cylinder 1732, surrounding the inner cylinder 1734 and applying an outward force to the end cap 1736. The crossbar end assembly 1720 includes a retaining rod 1724 coupled to a retaining bracket 1726 in the cylinder 1707 of the crossbar 1706. The retaining rod 1724 extends into the inner cylinder 1734 of the piston assembly 1730. The piston assembly 1730 includes an end stop 1738 positioned in the inner cylinder 1734. The end stop 1738 engages an end 1725 of the retaining rod 1724 to restrict the movement of the piston assembly 1730 in the direction of the end of the crossbar 1706 to retain the piston assembly 1730 at maximum extension point. The maximum extension of the piston assembly 1730 is thus determined based on the length of the retaining rod 1724. Thus, when the L-arms 112 are not in the stowed position, the spring 1722 may cause the piston assemblies 1730 to extend from their respective sides of the crossbar 1706 until the retaining rod 1724 contacts the end stop 1738. The crossbar end assembly 1720 may be designed such that there is adequate overlap between the cylinder 1707 of the crossbar 1706 and the outer cylinder 1732 of the piston assembly 1730 at its maximum extension point to resist bending forces when towing a vehicle, taking into account material properties and component geometries.

Figure 19:
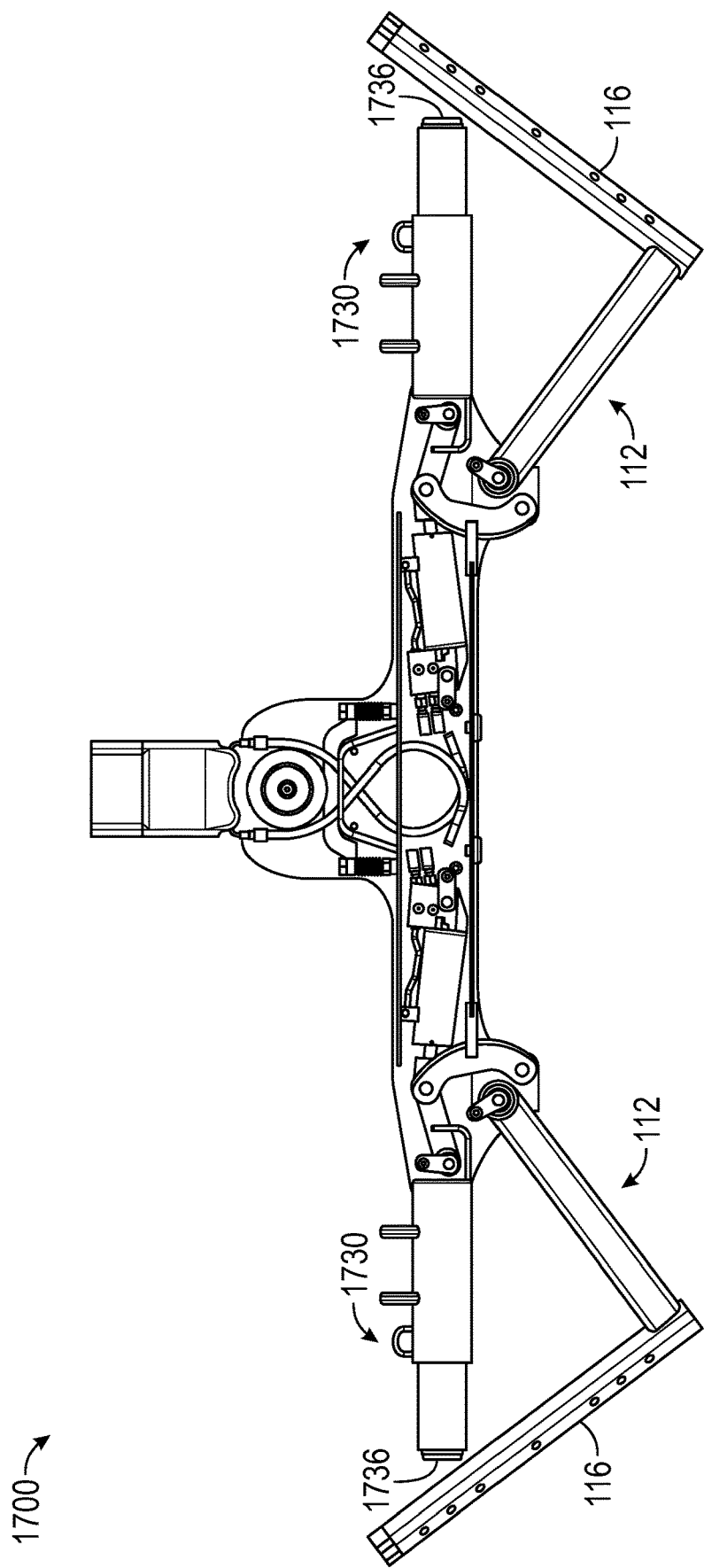
FIGS. 19-22 are plan views of the wheel grid of FIG. 17 transitioning from an engaged position to a stowed position.
Figure 20:
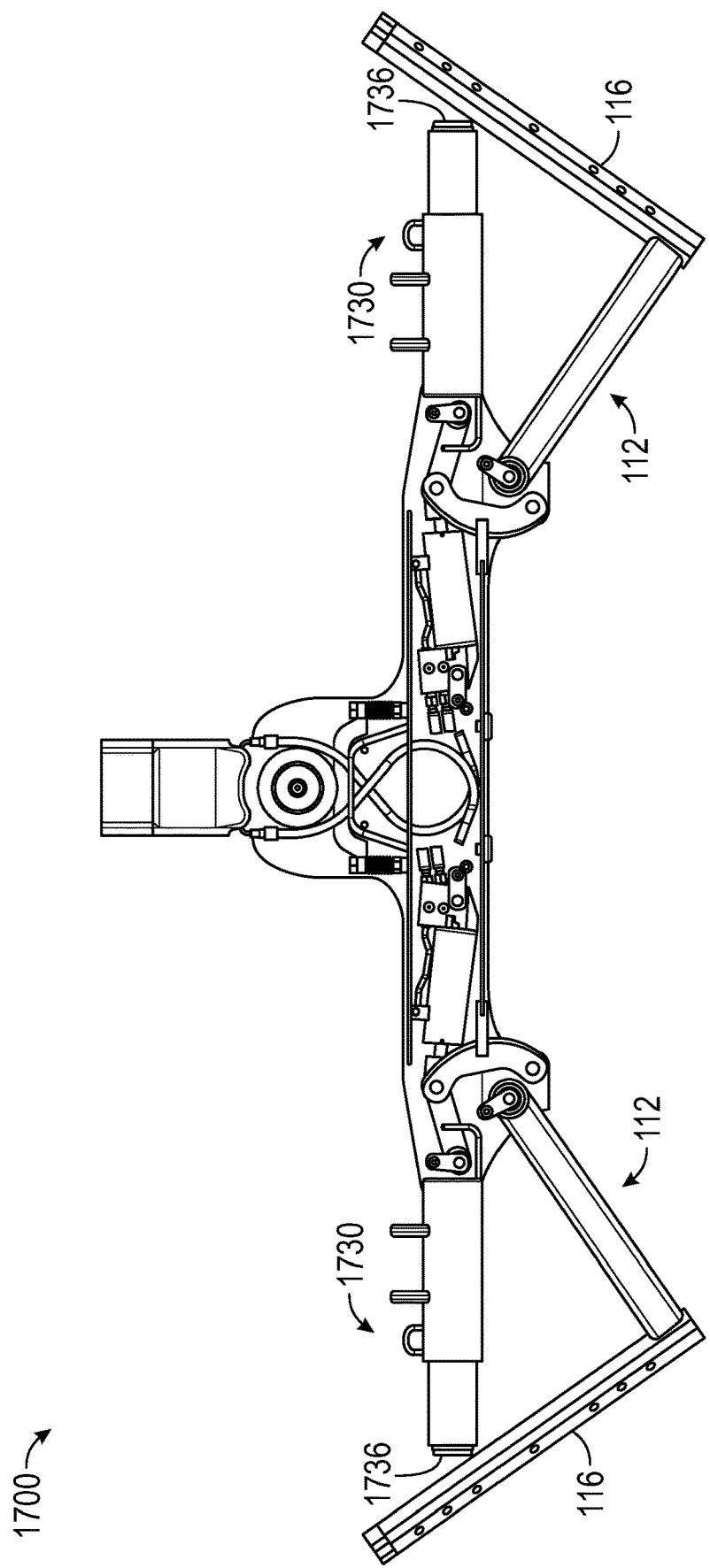
Figure 21:
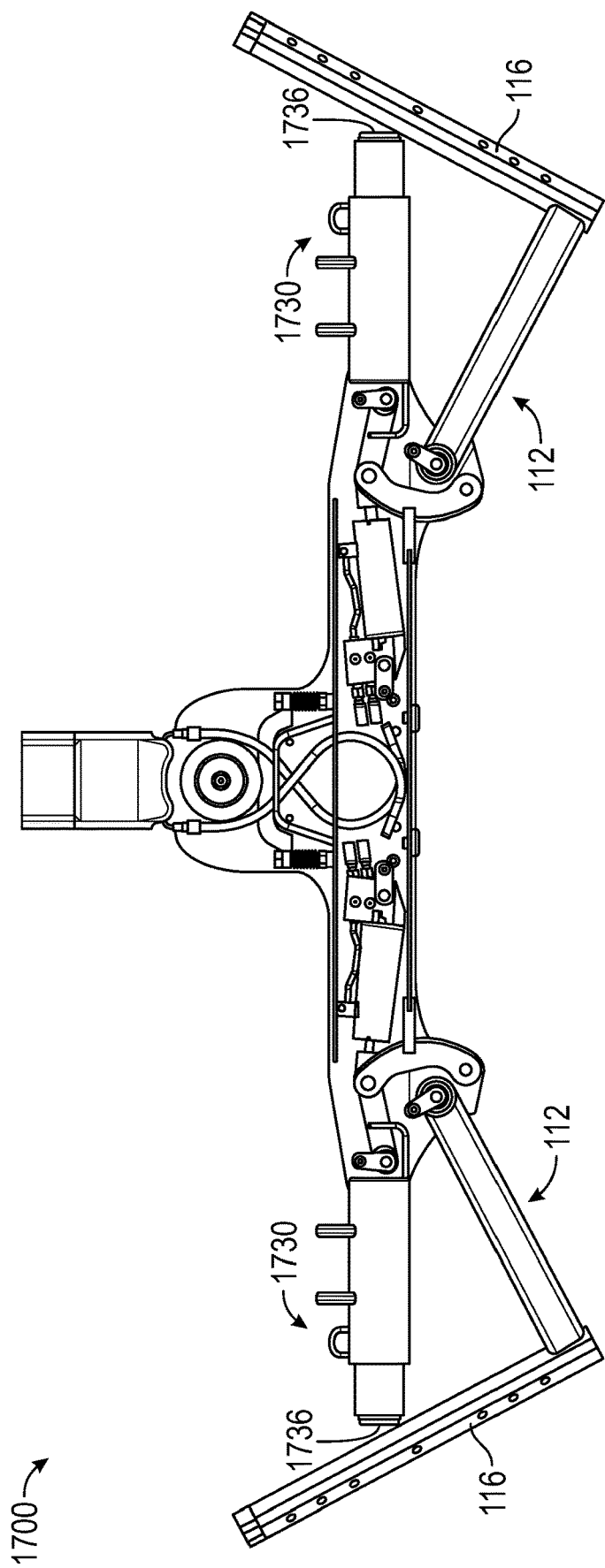
Figure 22:
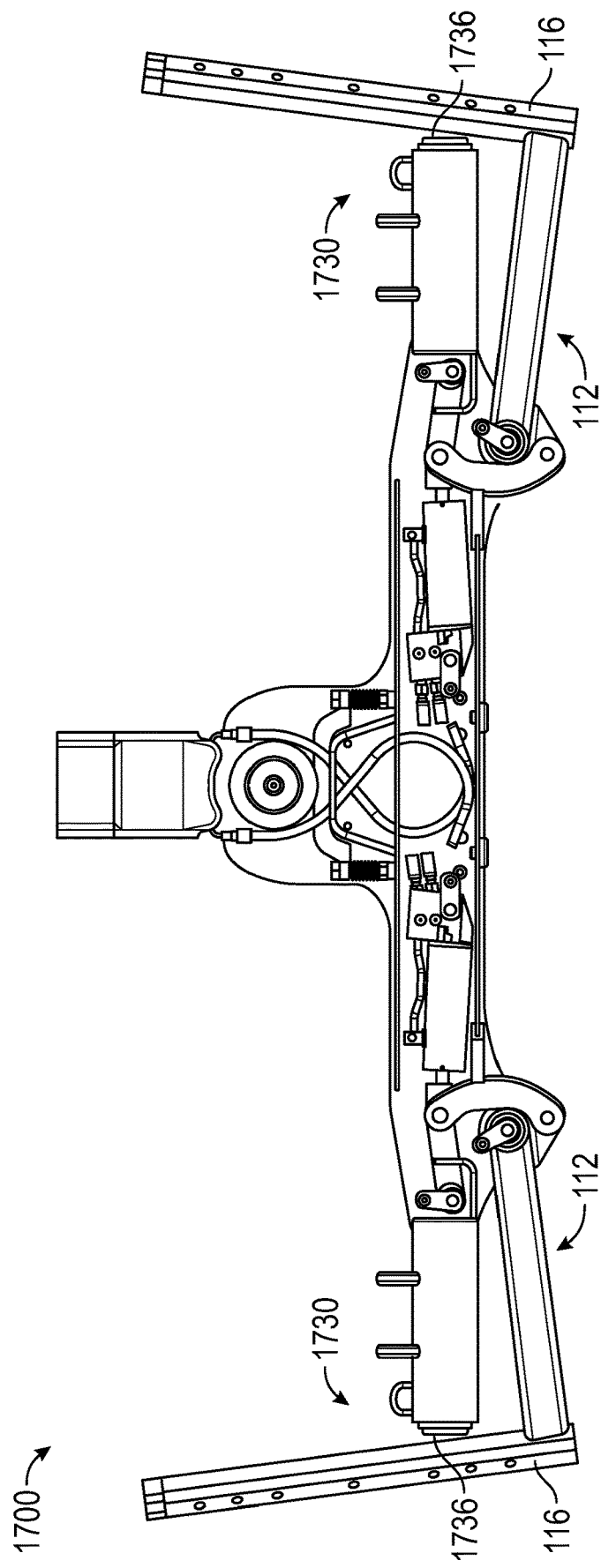
Figure 23:
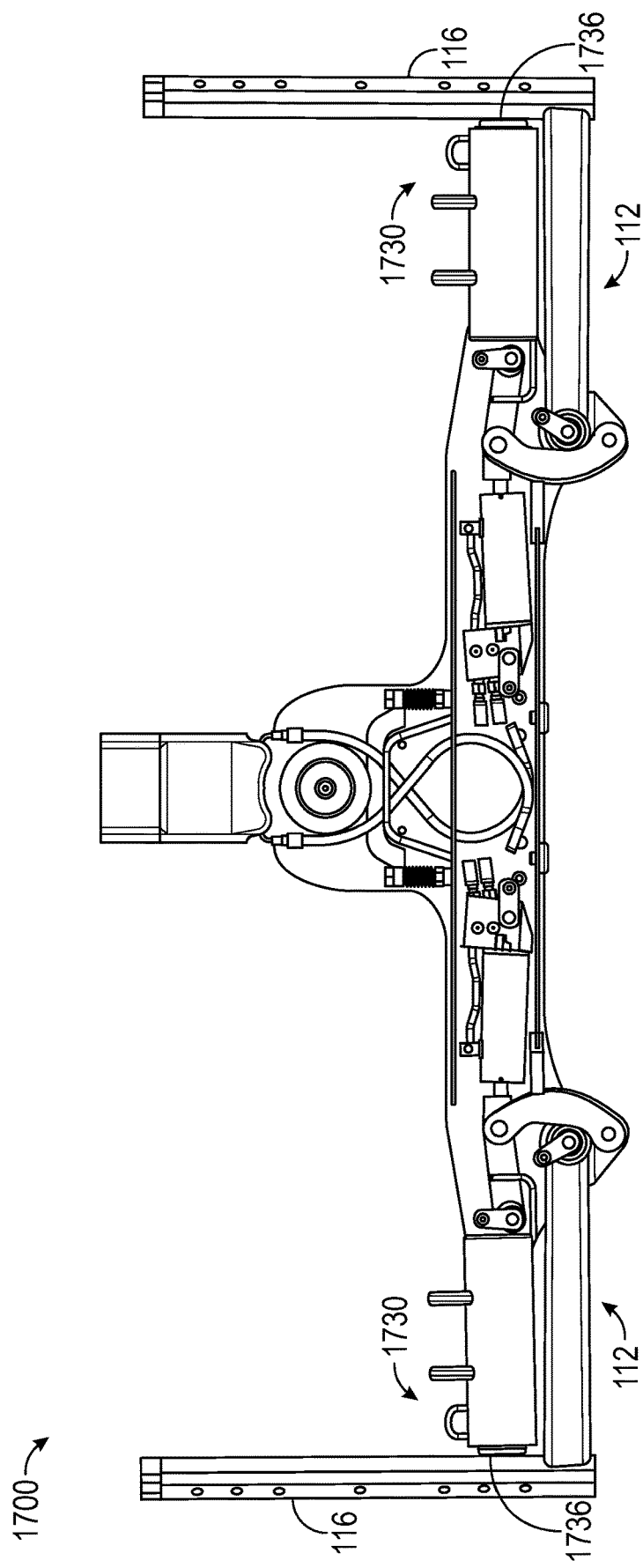
FIG. 23 is a plan view of the wheel grid of FIG. 17 in a stowed position.

FIGS. 19-20 show the wheel grid 1700 transitioning into a stowed position, according to some embodiments. The wheel grid 1700 may actuate the L-arms 112 similarly to the wheel grid 100, as shown in FIGS. 5-10. However, instead of the wheel brace members 116 passing under a cantilevered portions 122 of the crossbar 106 when moving into the stowed portion, the wheel brace members 116 contact the piston assemblies 1730 and push them into the cylinders 1707 of the crossbar 1706. FIG. 19 shows the wheel grid 1700 just before the wheel brace members 116 contact the end caps 1736 of the piston assemblies 1730. FIG. 20 shows the wheel grid 1700 just as the wheel brace members 116 contact the end caps 1736 of the piston assemblies 1730. The end caps 1736 may be made from a material that provides reduced friction between the end caps 1736 and the wheel brace members 116, for example, a hard plastic material. Reducing this friction may reduce the force required from the linear actuators 150 and may reduce the amount of scratches and wear on the wheel brace members 116 and the outer cylinder 1732 of the piston assembly 1730. FIGS. 21 and 22 show the wheel grid 1700 as the piston assemblies 1730 are being pushed into the cylinders 1707 of the crossbar 1706. FIG. 23 shows the wheel grid 1700 with the L-arms 112 in a stowed position with the piston assemblies 1730 pushed into the cylinders 1707 of the crossbar 1706. The wheel grid 1700 is designed such that the piston assemblies 1730 can be pushed far enough into the cylinder 1707 such that the wheel brace members 116 are perpendicular to the crossbar 106 in the stowed position.

Wheel Grid with Pivotable Crossbar Ends

Figure 24:
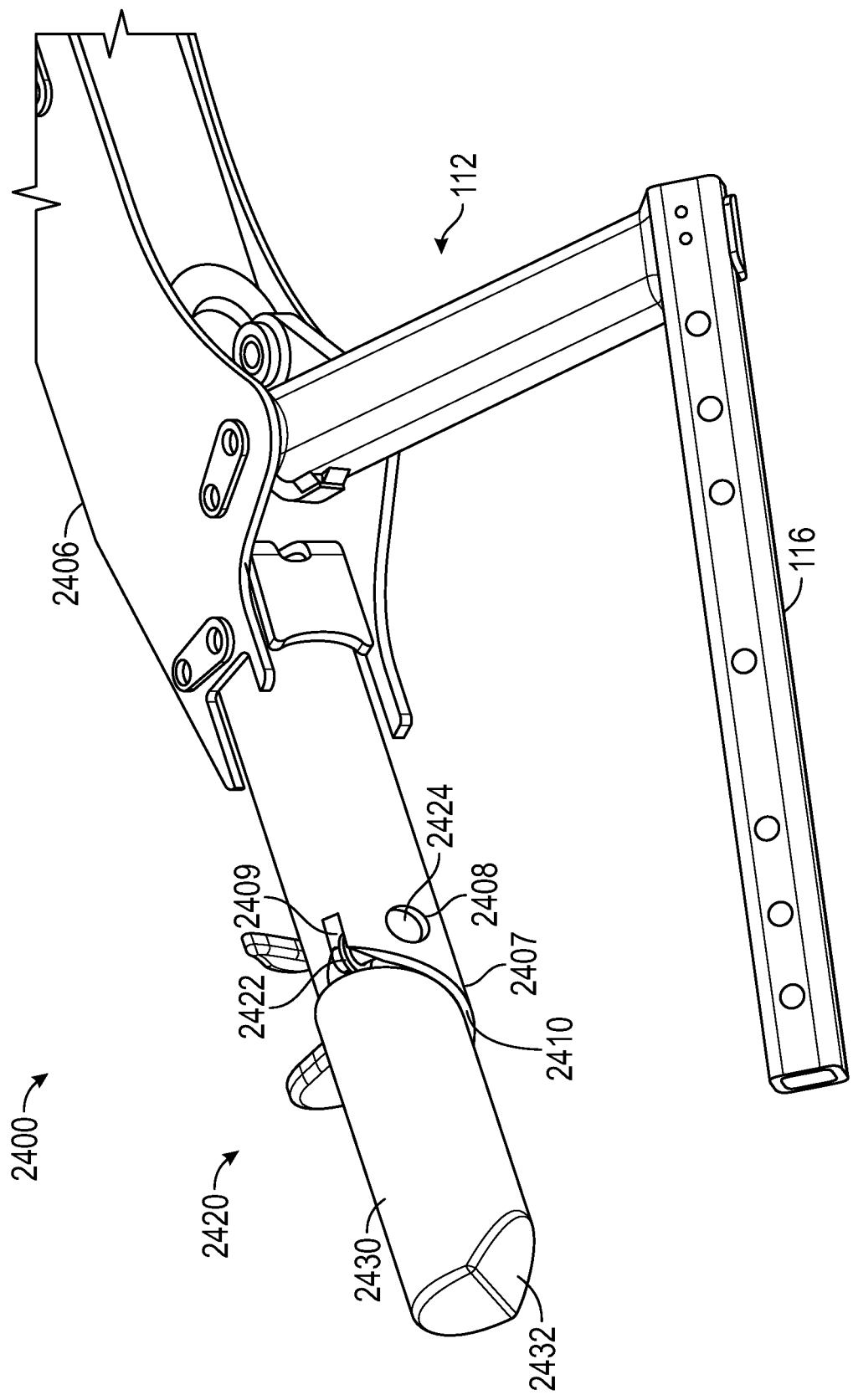
FIG. 24 is a perspective view of a wheel grid, according to an exemplary embodiment.
Figure 25:
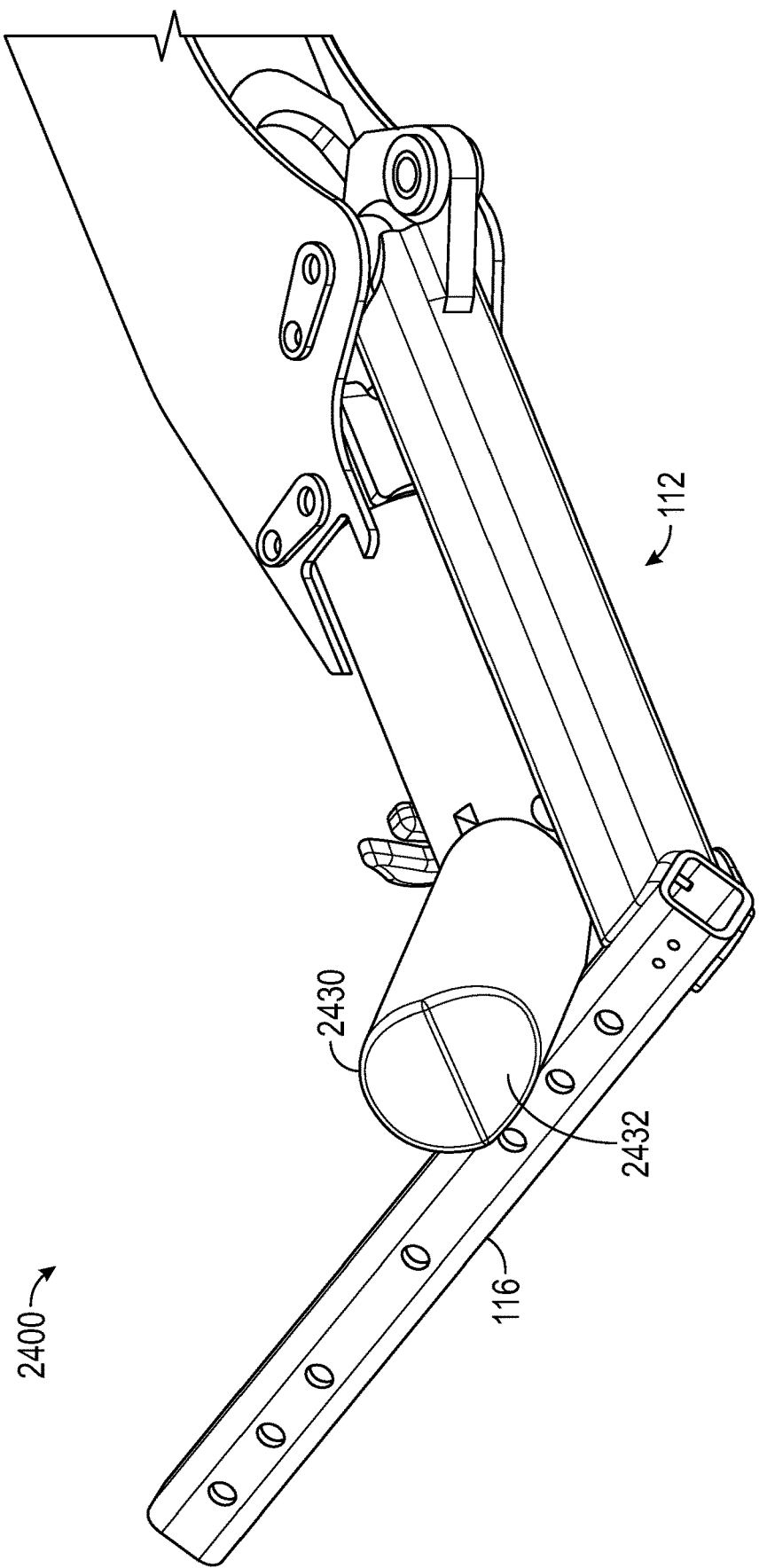
FIG. 25 is a perspective view of the wheel grid of FIG. 24 in a stowed position.

Referring now to FIGS. 24 and 25, a wheel grid 2400 is shown, according to some embodiments. The wheel grid 2400 is substantially similar to the wheel grid 100 and the wheel grid 1700, except as shown and described. Rather than including a cantilevered portion (e.g., the cantilevered portion 122 of wheel grid 100), the wheel grid 2400 may include a pivotable crossbar end assembly 2420. The crossbar 2406 may include a hollow cylinder 2407 (e.g., a tube) at each end. The crossbar end assembly 2420 may include a crossbar end 2430 (e.g., a wheel support) that is pivotably coupled to the hollow cylinder 2407. The crossbar end 2430 may include or may be coupled to a bracket 2422. A pin 2424 may couple the bracket 2422 to a hole 2408 on each side of the hollow cylinder 2407, such that the bracket 2422 and the crossbar end 2707 can rotate relative to the crossbar 2406. The hollow cylinder 2407 may include an opening 2410 that allows the hollow cylinder 2407 to receive the bracket 2422. The opening 2410 may include shaped with the lower edge extending further than the upper edge, such that the lower edge, in cooperation with the pin 2424, supports the crossbar end 2430 in a substantially horizontal position and restricts the rotation of the crossbar end 2430 beyond the horizontal position. The upper edge of the opening 2410 is recessed to allow the crossbar end 2430 to rotate upward. The opening 2410 also includes a slot 2409 that allows the bracket 2422 to rotate upward through the slot 2409. When the L-arms 112 are in the engaged position, a crossbar end 2430 and a corresponding wheel brace member 116 on each side of the wheel grid 2400 cooperatively engage a tire of a towed vehicle. The wheel grid 2400 can then lift the tires of the towed vehicle off the ground to tow the towed vehicle. As discussed above with regard to the wheel grid 100 and the wheel gid 1700, when no towed vehicle is being engaged by the wheel grid 2400, the L-arms 112 may rotate into a stowed position, with the wheel brace members 116 pointing towards the tow vehicle and substantially perpendicular to the crossbar 2406. When the L-arms 112 rotate from the engaged position to the stowed position, the L-arms 112 may contact and displace the crossbar ends 2430, causing the crossbar ends 2430 to rotate relative to the crossbar 2406. The L-arms 112 may push the crossbar ends 2430 upward, such that the crossbar end 2430 rest on an upper surface of the wheel brace members 116 when the L-arms 112 are in the stowed position. The engaged position of the L-arm 112 may be described as a first position, and the stowed position of the L-arm 112 may be described as a second position. The crossbar end 2430 may be described as being in a third position when the L-arm 112 is in the first position and the crossbar end 2430 is substantially horizontal and in a fourth position when the L-arm 112 is in the second position and the crossbar end 2430 is displaced and resting on the L-arm 112.

The crossbar end 2430 may include an angled portion 2432 at its outer end. When the L-arm 112 rotates into the stowed position, the wheel brace member 116 may contact the angled portion 2432 before contacting any other portion of the crossbar end 2430. As shown in FIG. 25, the angled portion 2432 is positioned such that the crossbar end 2430 rotates upward about the pin 2424 as the wheel brace member 116 rotates further toward the stowed position. As discussed above, in the stowed position, the crossbar ends 2430 rests on a top surface of the wheel brace member 116. When the wheel brace member 116 rotates back to a loading position, the crossbar end 2430 can rotate back to a horizontal position under its own weight and/or with the assistance of a spring. As with the wheel grid 100 and the wheel grid 1700, this orientation allows the L-arms 112 to rotate to a position in which the wheel brace members are closer to the center of the wheel grid 3400 that the maximum extension of the crossbar ends 2430. The hole 2408 and the bottom edge of the opening 2410 form a couple that supports the crossbar end 2430 in a substantially horizontal orientation when the L-arms 112 are in an engaged position, for example, when towing a vehicle.

Wheel Grid with Removable Wheel Brace Members

Figure 26:
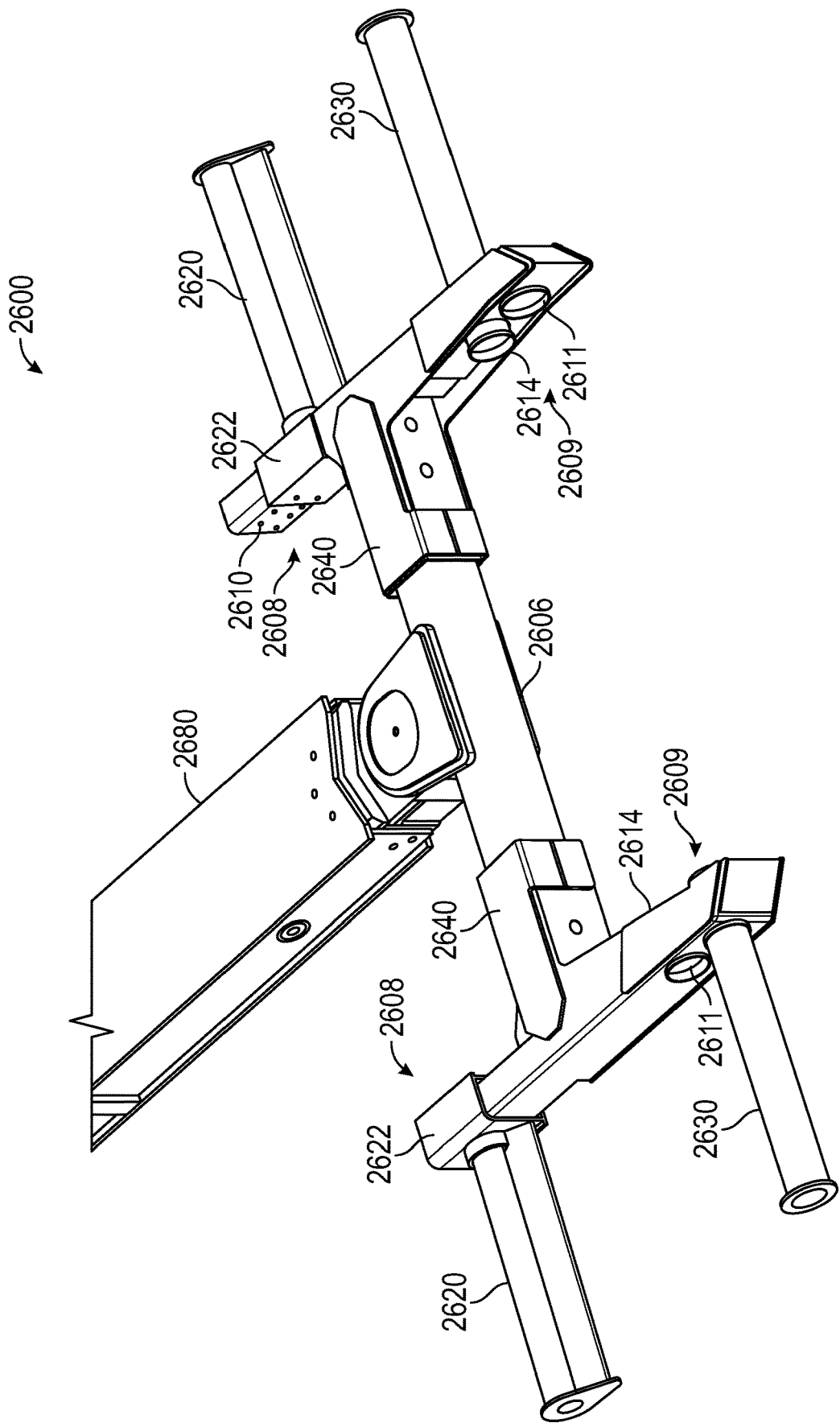
FIG. 26 is a perspective view of a wheel grid, according to an exemplary embodiment.

Referring now to FIG. 26, a wheel grid 2600 is shown, according to some embodiments. The wheel grid 2600 includes a crossbar 2606 that may be pivotably coupled to a main boom 2680 of a tow vehicle. Each end of the crossbar 2606 is coupled to an extension member 2614 that extends substantially perpendicularly to the crossbar 2606. A forward wheel brace member 2620 is removably coupled to a forward end 2608 of each extension member 2614 and a rear wheel brace member 2630 is removably coupled to a rear end 2609 of each extension member 2614. The wheel brace members 2620, 2630 may extend substantially perpendicularly from the extension member 2614. For example, the forward wheel brace member 2620 may include a mounting bracket 2622 that can be slidably coupled to the forward end 2608 and pinned to holes 2610 in various mounting positions. The rear wheel brace member 2630 may be selectably inserted and coupled to an opening 2611 in the rear end 2609 of the extension member 2614. In some embodiments, the extension members 2614 may each include a mounting bracket 2640 that slides over the crossbar 2606 and can be pinned in various positions along the crossbar 2606 to adjust the distance between the extension members 2614. The wheel grid 2600 can thus be configured depending on the tire size and axle width of the towed vehicle by adjusting the positions of the forward and rear wheel brace members 2620, 2630 and the extension members 2614. For example, for a vehicle with larger tires, the forward and rear wheel brace members 2620, 2630 can be moved closer to the respective ends 2608, 2609 of the extension members 2614. In some embodiments, the forward wheel brace members 2620, rear wheel brace members 2630, and/or the extension members 2614 may be removable to reduce the footprint of the wheel grid 2600 when a vehicle is not being towed. The coupling and adjustment mechanisms disclosed are exemplary only and are not intended to be limiting.

Figure 27:
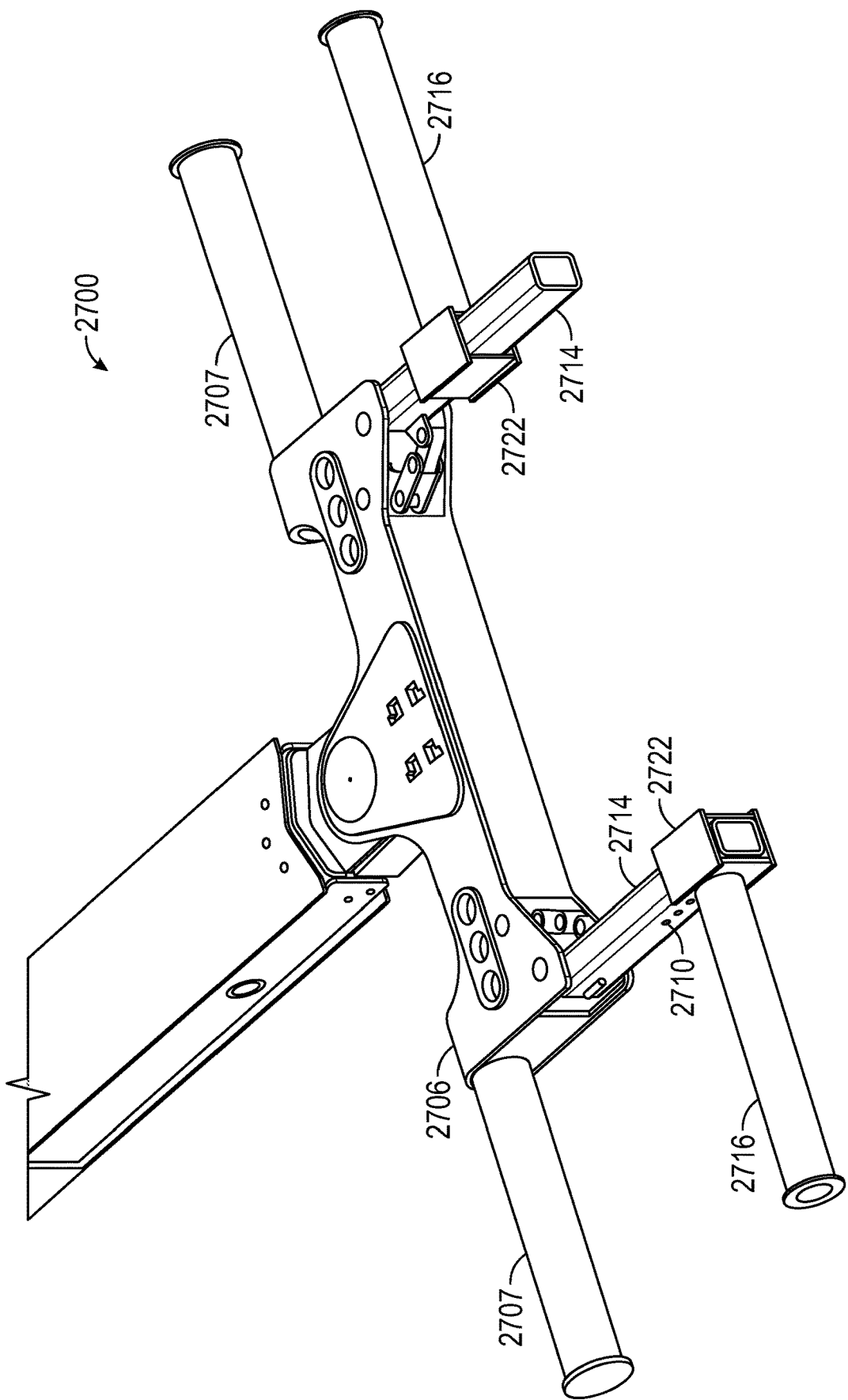
FIG. 27 is a perspective view of a wheel grid, according to an exemplary embodiment.

Referring now to FIG. 27, a wheel grid 2700 is shown, according to some embodiments. The wheel grid 2700 includes a crossbar 2706, including two crossbar ends 2707. In some embodiments, the crossbar ends 2707 may be removably coupled to the crossbar 2706. Two extension members 2614 are pivotably coupled to the crossbar 2706 and may be rotated, for example, by a linear actuator (e.g., a hydraulic cylinder), between a loading position and an engaged position, similar to the wheel grid 100. In the loading position, the extension members 2714 are substantially parallel and adjacent to the crossbar 2706. In the engaged position (e.g., as shown in FIG. 27), the extension members 2714 are substantially perpendicular to the crossbar 2706. The wheel grid 2700 includes wheel brace members 2716 that are removably coupled to the extension members 2714. For example, each wheel brace member 2716 may include a mounting bracket 2722 that can be slidably coupled to the extension member 2714 and fastened to mounting holes 2710 in various mounting positions by a pin or other fastener. Thus, similar to wheel grid 2600, the wheel grid 2700 can be configured based on the tire size of the towed vehicle by adjusting the mounting position of the wheel brace members 2716. When a vehicle is not being towed, the wheel brace members 2716 can be removed and the extension members 2714 can be rotated into the loading position, parallel and adjacent to the crossbar 2706 to reduce the footprint of the wheel grid 2700. Thus, the loading position of the extension members 2714 may also be a stowed position when the wheel brace members 2716 are removed from the extension members 2714.

Figure 28:
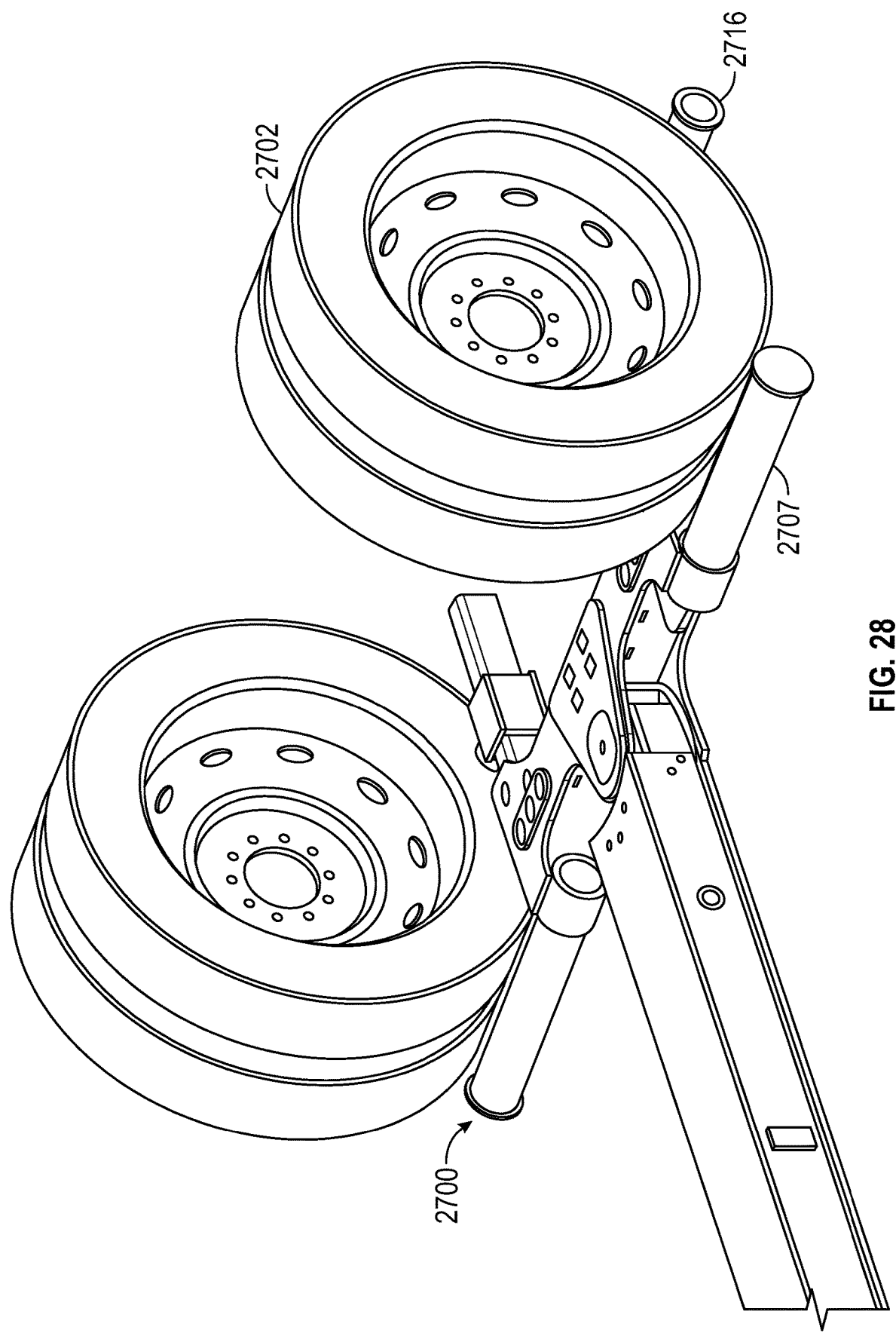
FIG. 28 is a perspective view of the wheel grid of FIG. 27 engaging tires of a vehicle.

FIG. 28 shows the wheel grid 2700 and tires 2702 of a towed vehicle. The wheel brace member 2716 has been adjusted to a position in which the tires 2702 can be securely supported by the wheel brace member 2716 and the crossbar end 2707, without sitting so low that the undercarriage of the vehicle comes into contact with the wheel grid 2700.

Figure 29:
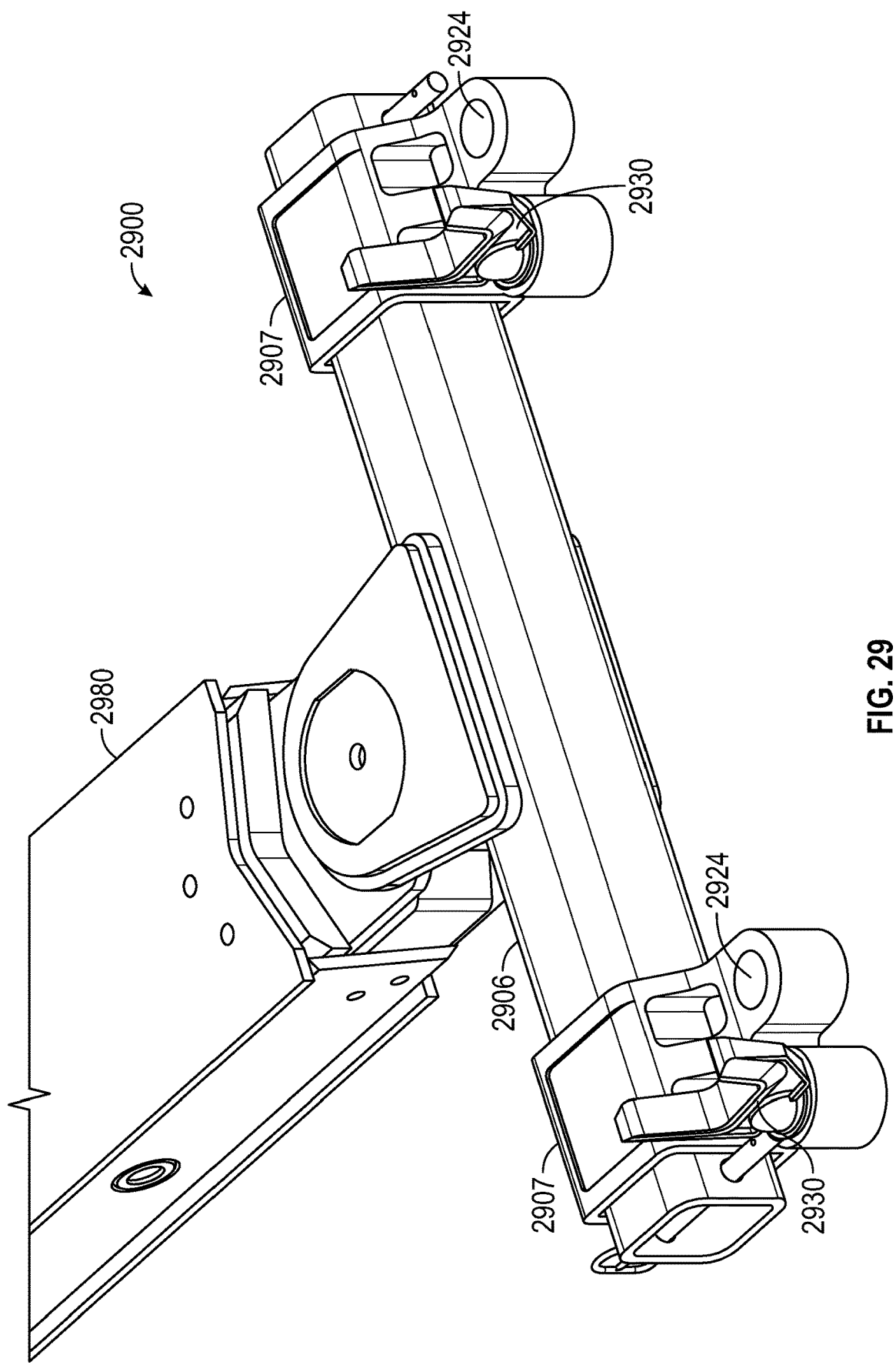
FIG. 29 is a perspective view of an axle tow lift assembly, according to an exemplary embodiment.

FIG. 29 shows an axle lift tow assembly 2900 mounted to a main boom 2980, according to some embodiments. The axle lift tow assembly 2900 includes a crossbar 2906 with an axle fork assembly 2920 mounted to each end. The axle fork assemblies 2920 include a mounting bracket 2922 that is pinned to the crossbar 2706. The mounting bracket 2922 includes one or more openings 2924 (e.g., mounting holes) that may selectively receive an axle fork 2930. The axle forks 2930 are shaped to receive an axle of a towed vehicle. Thus, rather than lifting one end of the towed vehicle by engaging the tires, the axle forks 2730 engage an axle of the tow vehicle and the axle lift tow assembly 2900 lifts the end of the vehicle by the axle. The axle forks 2930 can be positioned in selected openings 2924 depending on the width and shape of the axle of the towed vehicle.

Figure 30:
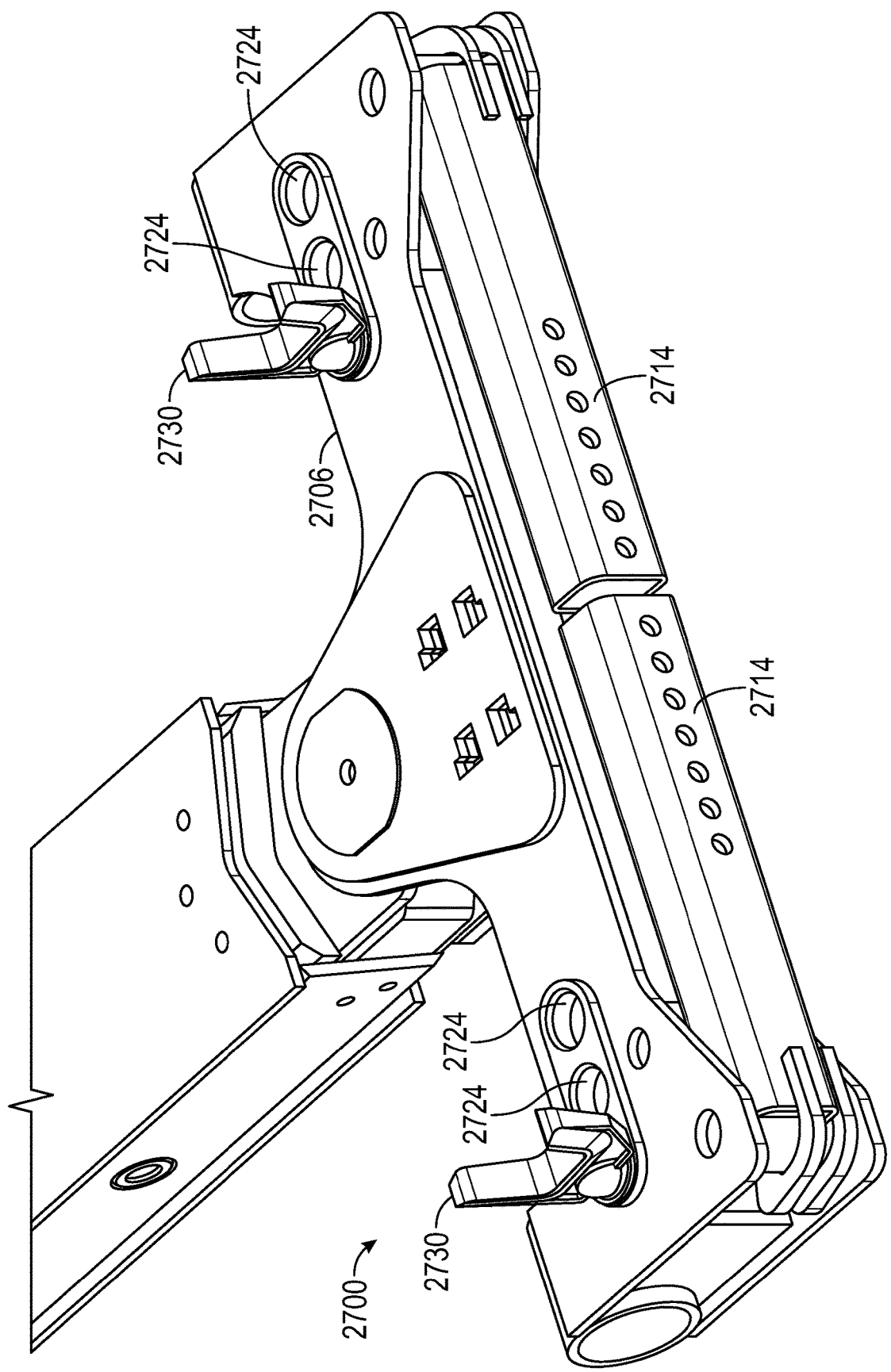
FIG. 30 is a perspective view of the wheel grid of FIG. 27 in an axle tow configuration.
Figure 31:
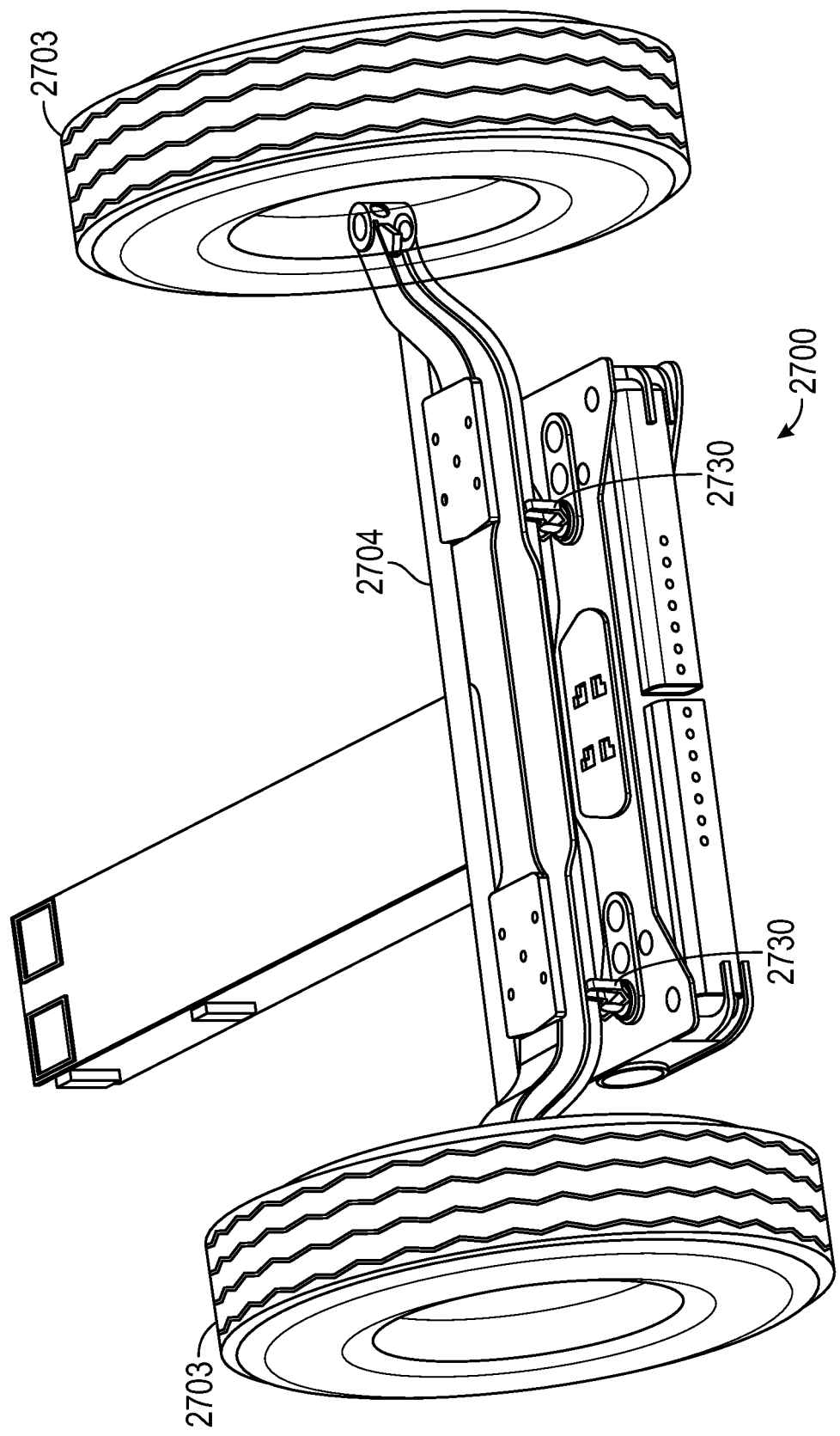
FIG. 31 is a perspective view of the wheel grid of FIG. 27 in an axle tow configuration engaging an axle of a vehicle.
Figure 32:
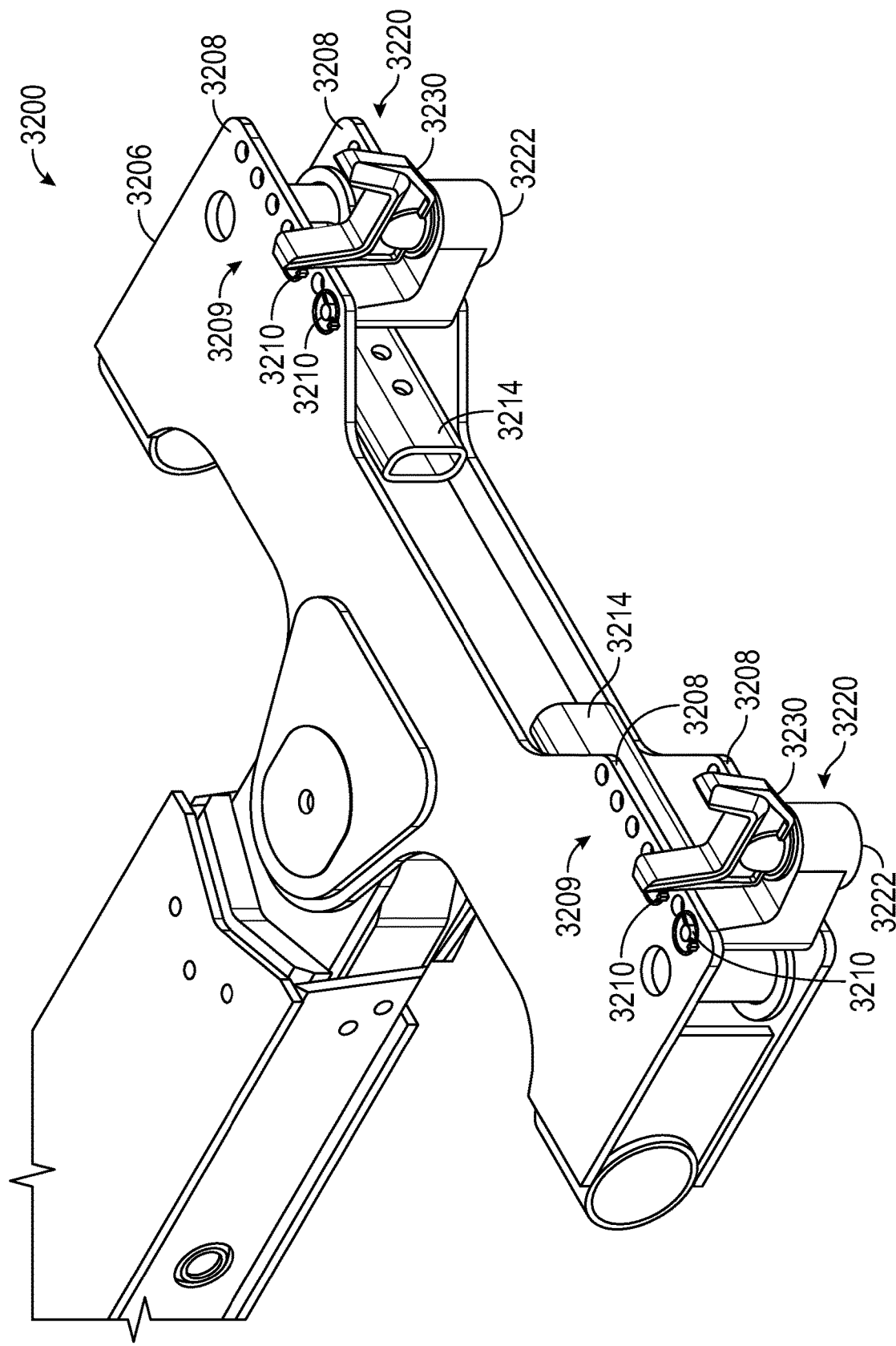
FIG. 32 is a perspective view of a wheel grid in an axle tow configuration, according to an exemplary embodiment.
Figure 33:
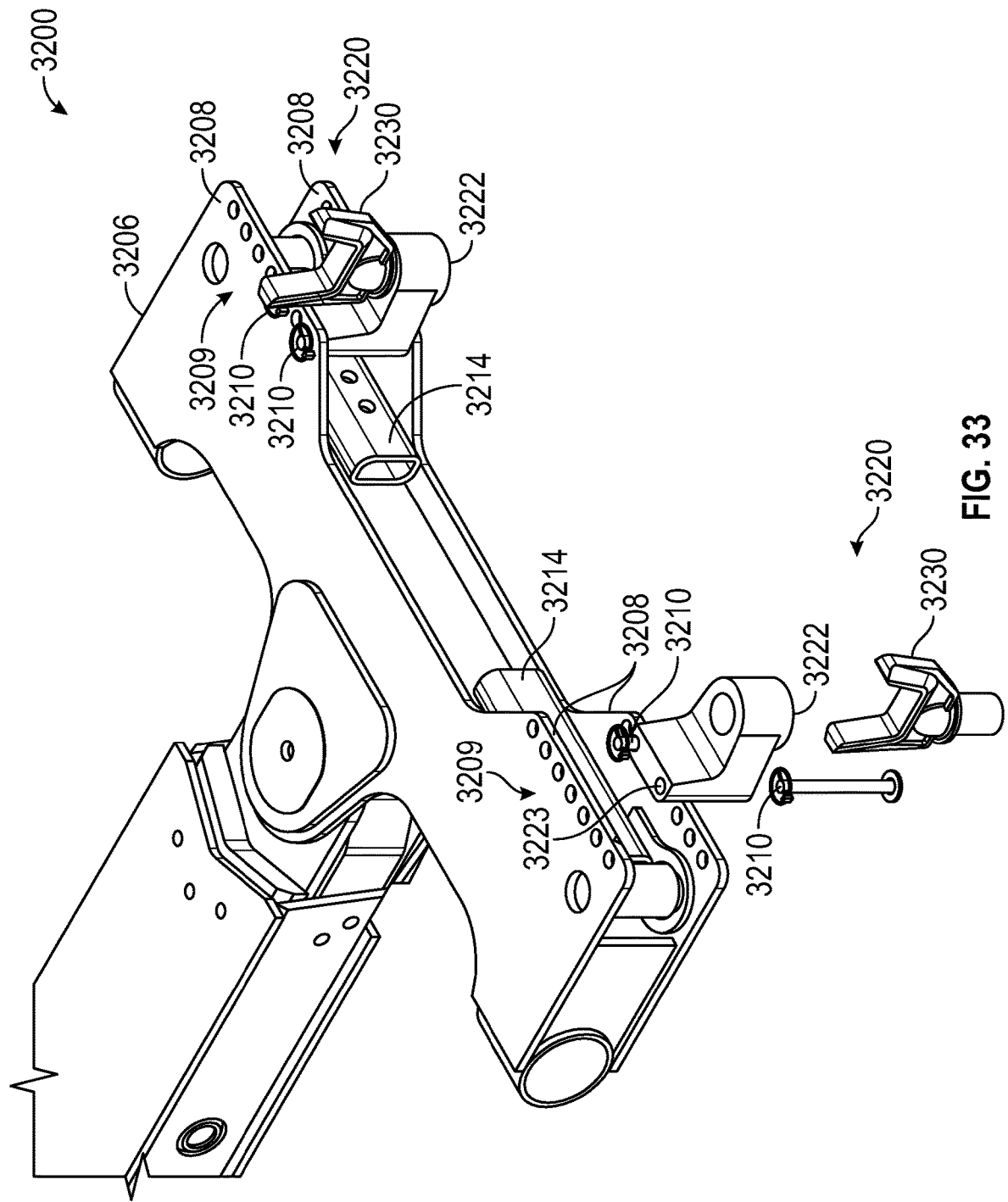
FIG. 33 is a partially exploded view of the wheel grid of FIG. 32.
Figure 34:
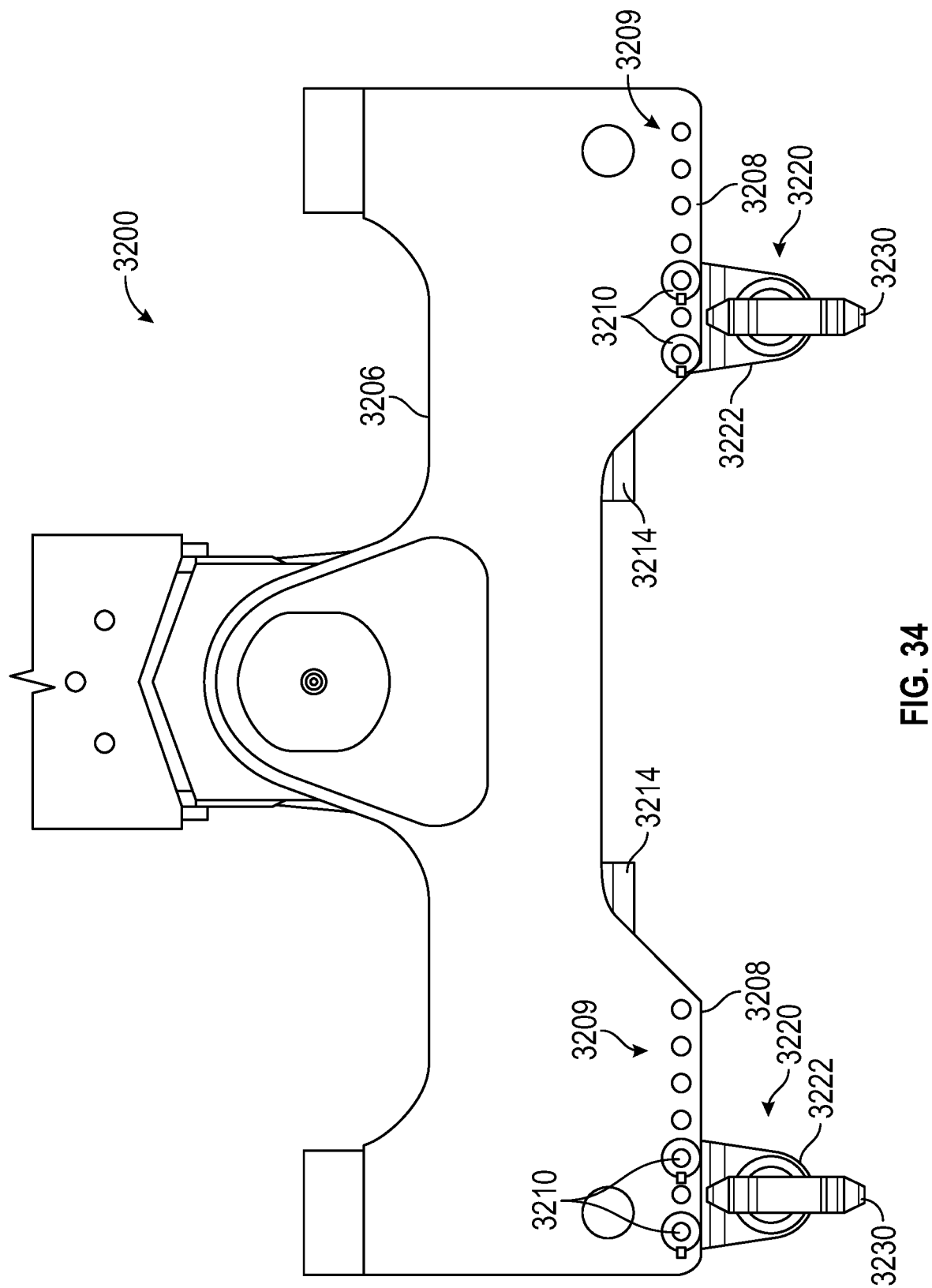
FIG. 34 is a plan view of the wheel grid of FIG. 32 in the axle tow configuration.

FIGS. 30 and 31 show the wheel grid 2700 in an axle tow configuration, according to some embodiments. The wheel brace members 2716 (not shown) have been removed from the extension members 2714, and the extension members 2714 have been rotated into a stowed position. The crossbar ends 2707 (not shown) have also been removed from the crossbar 2706. The crossbar 2706 includes several openings 2724 (e.g., mounting holes) that may selectively receive an axle fork 2730. Thus, the wheel grid 2700 may also function as an axle lift tow assembly, similar to the axle lift tow assembly 2900. With the crossbar ends 2707 and wheel brace members 2716 removed, the wheel grid 2700 fits between the wheels of the towed vehicle, and the axle forks 2730 can engage the axle of the towed vehicle. An end of the towed vehicle can then be lifted by its axle. The axle forks 2730 can be selectively positioned in the appropriate openings 2724 depending on the width and shape of the axle. FIG. 31 shows the wheel grid 2700 in the axle tow configuration, with the axle forks 2730 engaging the axle 2704 of the towed vehicle between the tires 270.

Figure 35:
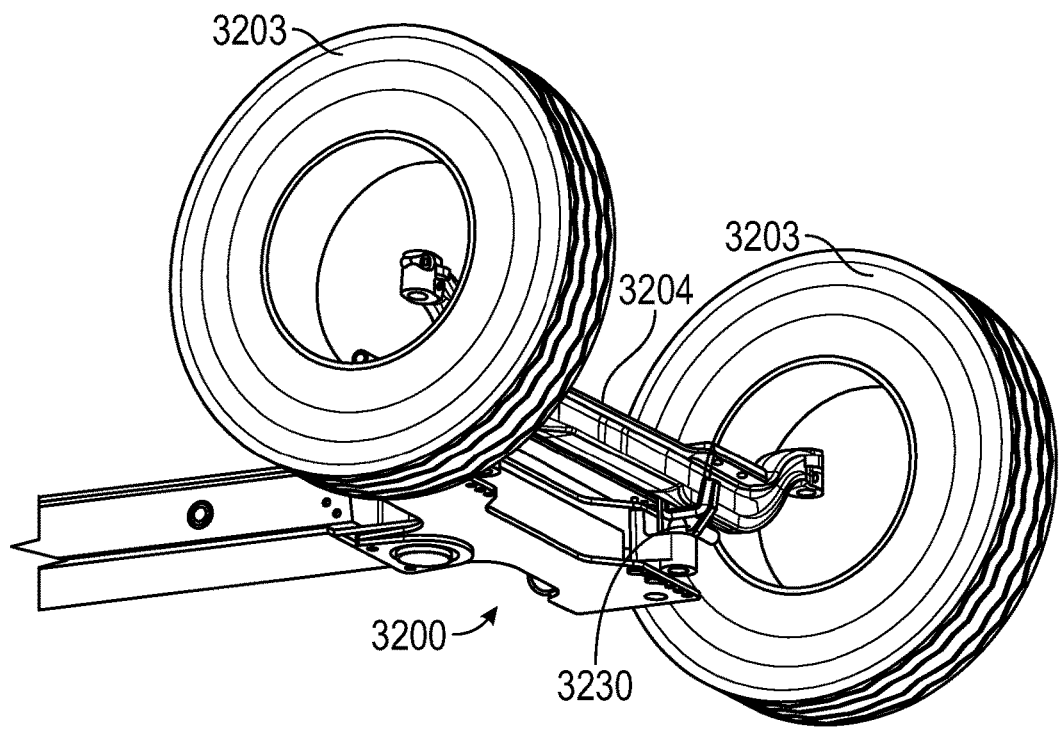
FIG. 35 is a perspective view of the wheel grid of FIG. 32 in an axle tow configuration engaging an axle of a vehicle.
Figure 36:
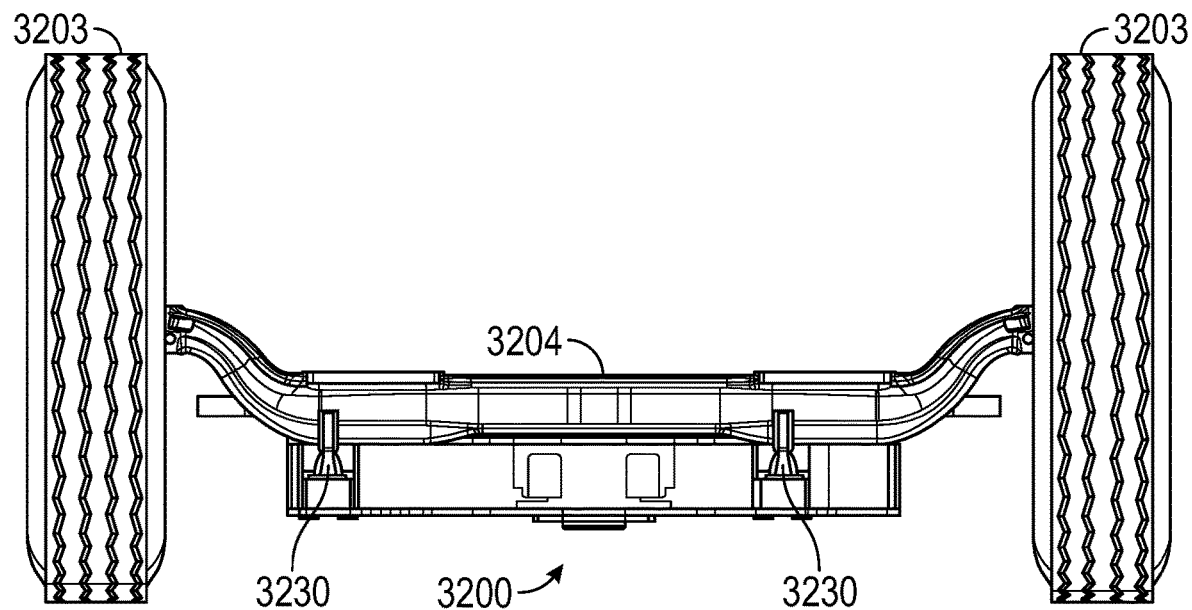
FIG. 36 is a front view of the wheel grid of FIG. 32 in an axle tow configuration engaging an axle of a vehicle.

Referring now to FIGS. 32-36, a wheel grid 3200 is shown in an axle lift configuration, according to some embodiments. The wheel grid 3200 may be substantially similar to the wheel grid 2700 with an alternative mounting arrangement for the axle fork assemblies 3220. The wheel grid 3200 includes a crossbar 3206 with a pair of flanges 3208 at each end. The flanges 3208 extend beyond the extension members 3214 in an aft direction of the wheel grid 3200 when the extension members 3214 are in the stowed position, as shown. The flanges 3208 each include mounting holes 3209 to which the axle fork assemblies 3220 can be attached, for example, via pins 3210. Each axle fork assembly 3220 includes a mounting bracket 3222, with two holes 3223 for receiving the pins 3210, and an axle fork 3230. The axle fork assemblies 3220 can be pinned in various positions to the various holes 3209 to adjust the wheel grid 3200 depending on the width and shape of the axle of the towed vehicle. FIGS. 35 and 36 show the wheel grid 3200 positioned between two tires 3203 of a towed vehicle, with the axle forks 3230 engaging an axle 3204 of the towed vehicle.

Figure 37:
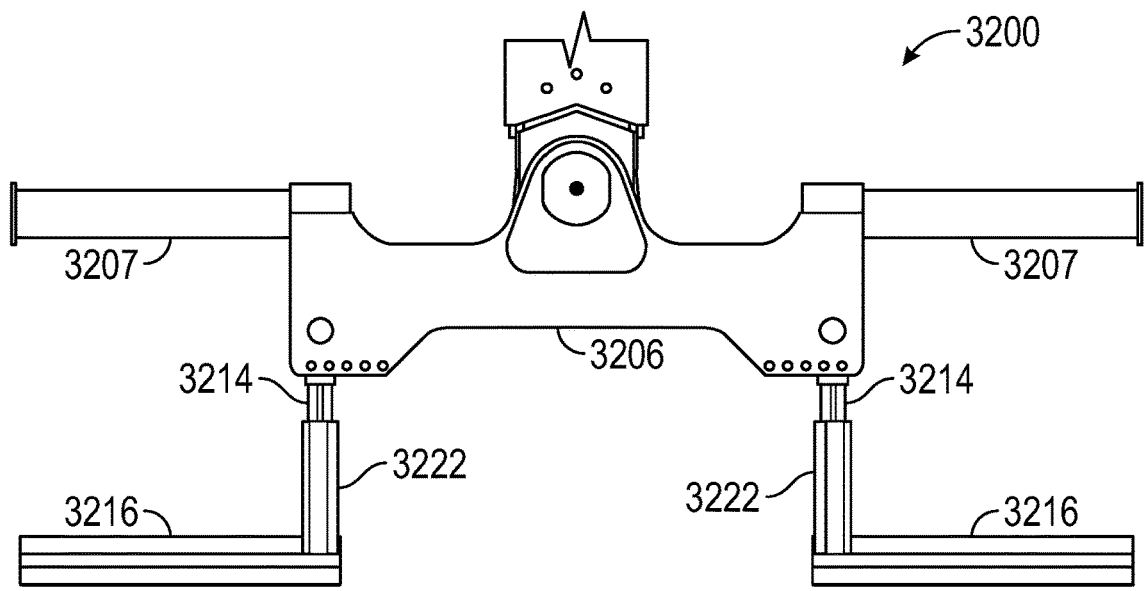
FIG. 37 is a plan view of the wheel grid of FIG. 32 in a wheel tow configuration.
Figure 38:
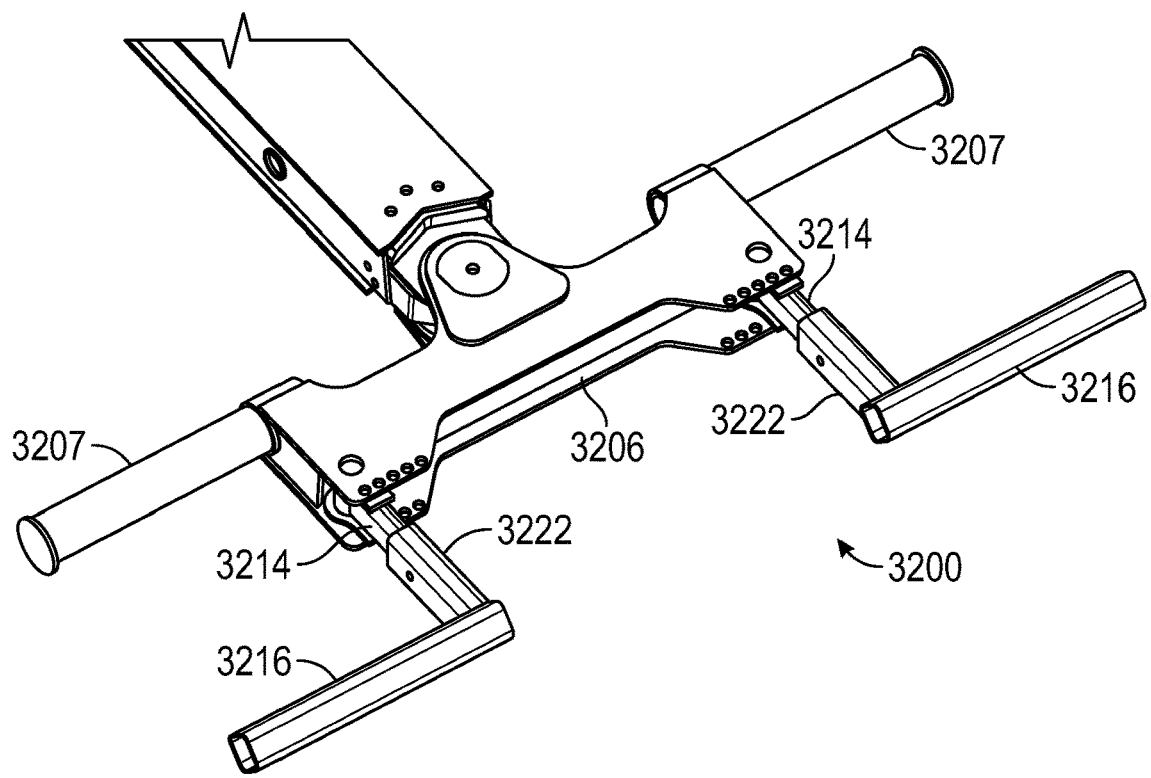
FIG. 38 is a perspective view of the wheel grid of FIG. 32 in a wheel tow configuration.
Figure 39:
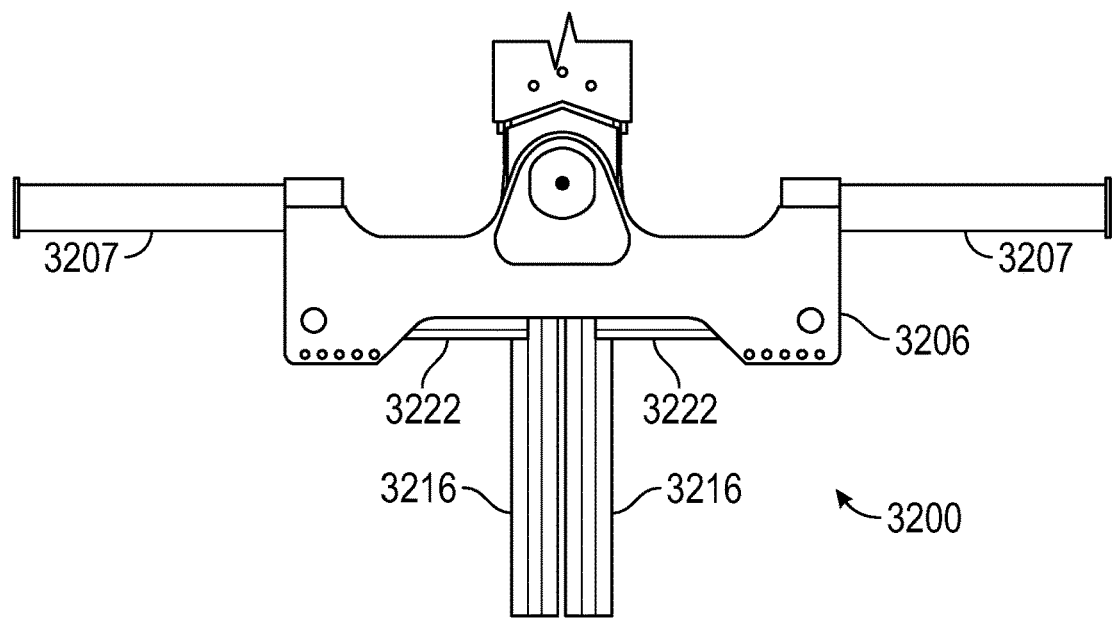
FIG. 39 is a plan view of the wheel grid of FIG. 32 in a wheel tow loading configuration.
Figure 40:
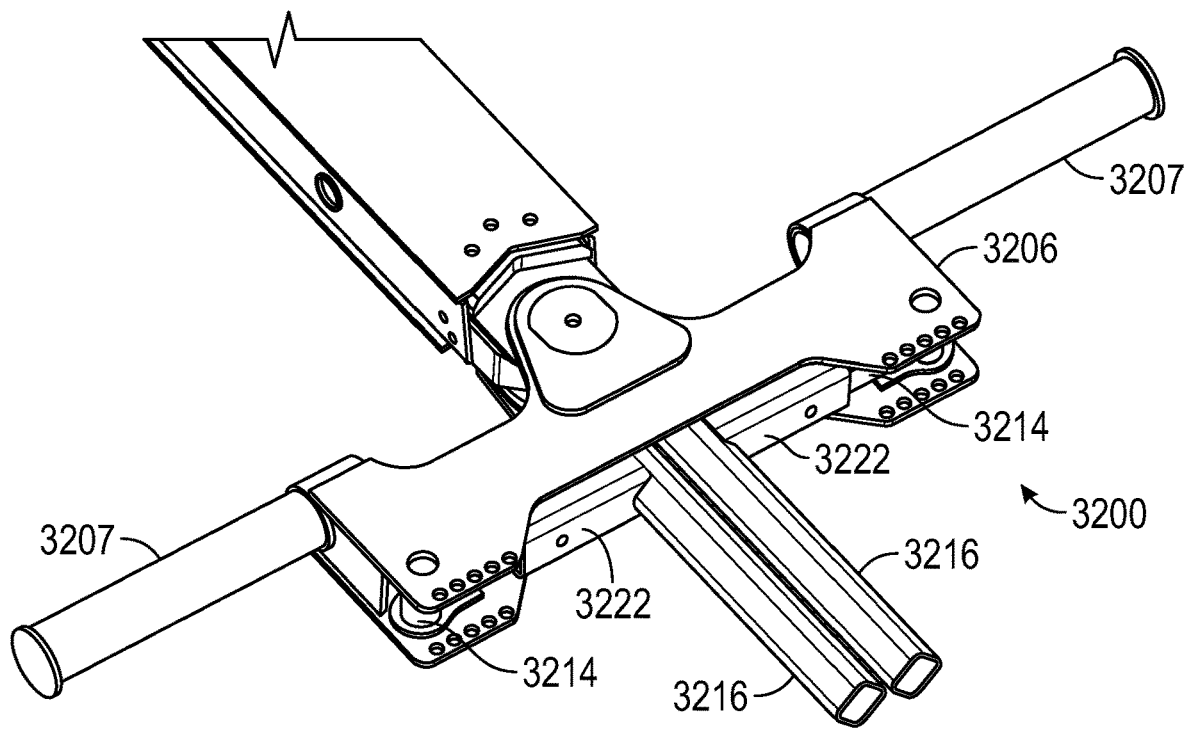
FIG. 40 is a perspective view of the wheel grid of FIG. 32 in a wheel tow loading configuration.
Figure 41:
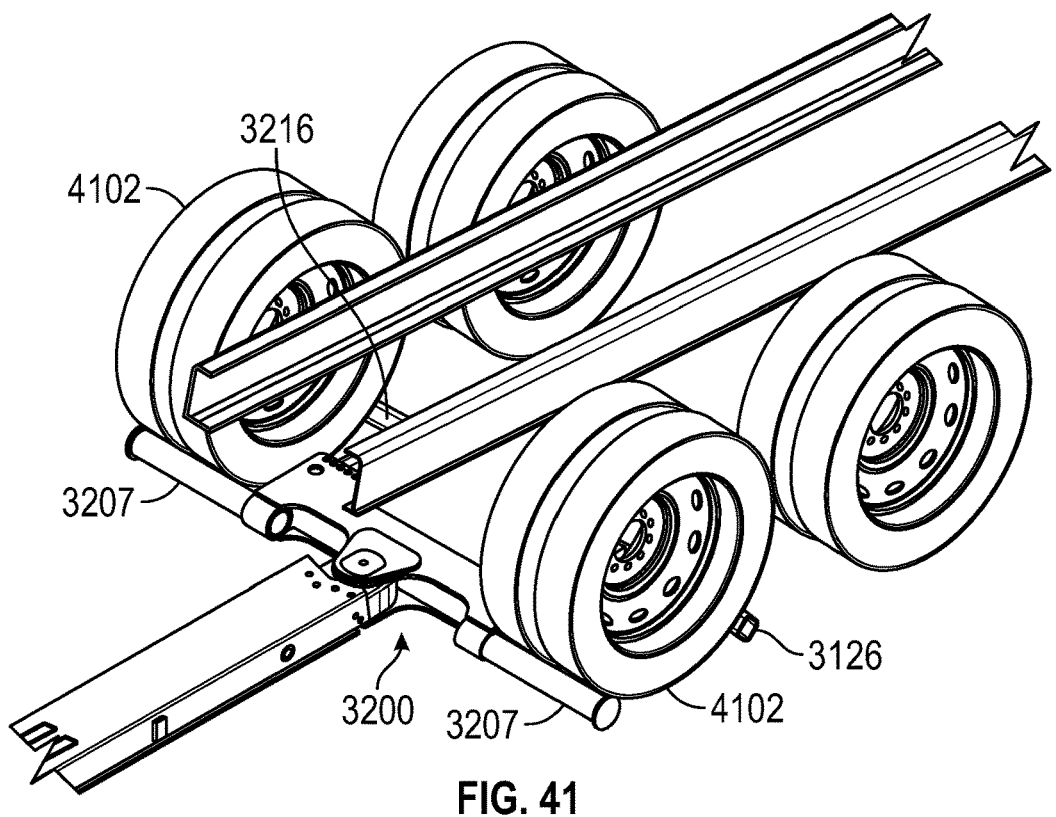
FIG. 41 is a perspective view of the wheel grid of FIG. 32 in a wheel tow configuration engaging tires of a vehicle.
Figure 42:
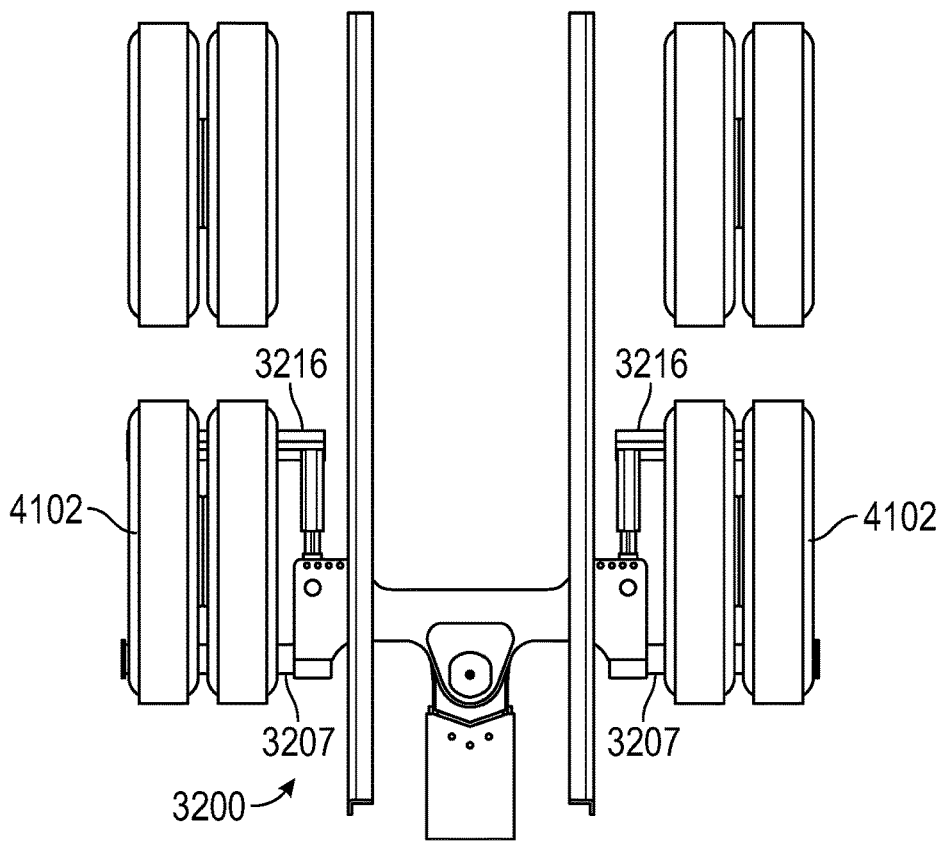
FIG. 42 is a plan view of the wheel grid of FIG. 32 in a wheel tow configuration engaging tires of a vehicle.

FIGS. 37-42 show the wheel grid 3200 in a wheel lift configuration, with the axle fork assemblies 3220 removed, crossbar ends 3207 attached to the crossbar 3206, and wheel brace members 3216 attached to the extension members 3214. The wheel brace members 3216 are similar to the wheel brace members 2716 of the wheel grid 2700, except that the mounting brackets 3222 extend substantially perpendicularly from the wheel brace members 3216 and slide over the extension members 3214 like a sleeve. This may enable a larger maximum distance between the wheel brace member 3216 and the crossbar ends 3207 without lengthening the extension members 3214. The mounting brackets 3222 can be pinned to the extension members 3214 in the same way the mounting brackets 2722 are pinned to the extension members 2714. FIGS. 37 and 38 show the wheel grid 3200 in an engaged position, while FIGS. 39 and 40 show the wheel grid 3200 in a loading position. With the wheel brace members 3216 attached, the wheel grid 3200 functions similarly to the wheel grid 2700. The extension members 3214 rotate into the loading position, and the tow vehicle is backed towards the towed vehicle until the crossbar ends 3207 contact the tires of the towed vehicle. Then, the extension members 3214 rotate into the engaged position, the wheel brace members 3216 engage the rear sides of the tires, and the towed vehicle can be lifted by the tires and towed away. FIGS. 40 and 41 show the wheel grid 3200 engaging the tires 4002 of a large vehicle. The wheel grid can be used to tow a vehicle with a large track width and but still fit between the tires and under the chassis of the tow vehicle when not in use by removing the crossbar ends 3207 and the wheel brace members 3216.

Crossbar Belting

In certain situations, it may be difficult or impossible to tow a vehicle by engaging the tires with a wheel grid (e.g., wheel grid 100). For example, if the tires of the towed vehicle are damaged or the wheels or tires are removed, the crossbar and L-arms may not be able to properly engage and lift the vehicle. Instead, one or more chains coupled to the crossbar may be used to lift the vehicle. The tow vehicle may back toward the towed vehicle until the crossbar is approximately aligned with the front bumper of the towed vehicle. Then, a chain may be coupled to a hook on one side of the crossbar, coupled to the axle of the towed vehicle, and then coupled to a hook on the other side of the crossbar. Alternatively, a separate chain may be coupled to each side of the crossbar and the axle. When the wheel grid is lifted, the chains lift the vehicle and the crossbar contacts or nearly contacts the front bumper. In this towing arrangement, the crossbar may cause damage to the bumper if there is no protection in place between the bumper and the crossbar, which is generally made of metal, such as steel or aluminum.

Figure 43:
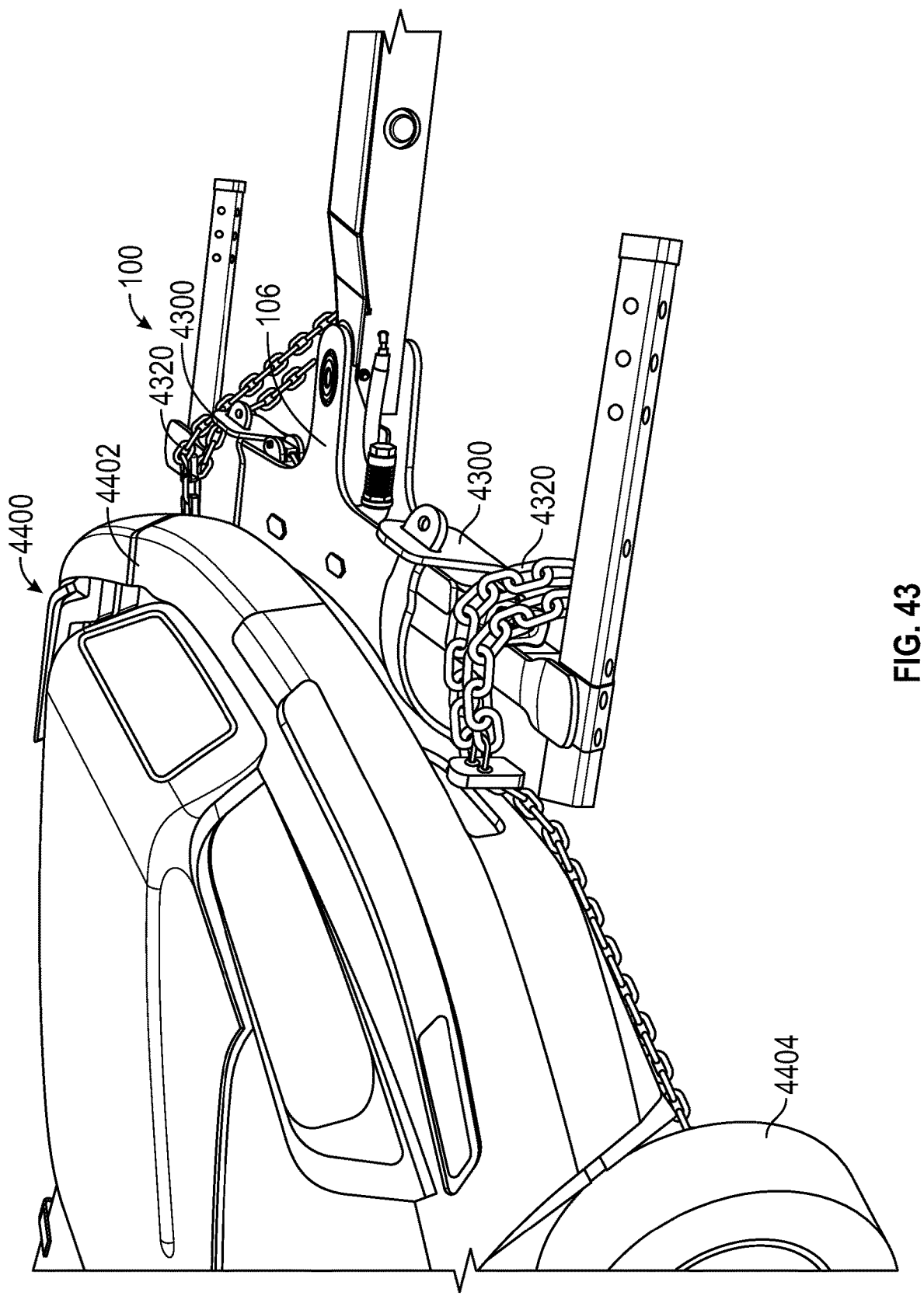
FIG. 43 is a perspective view of the wheel grid of FIG. 1 lifting a vehicle with chains, including protective belts positioned between the vehicle bumper and the wheel grid, according to an exemplary embodiment.
Figure 44:
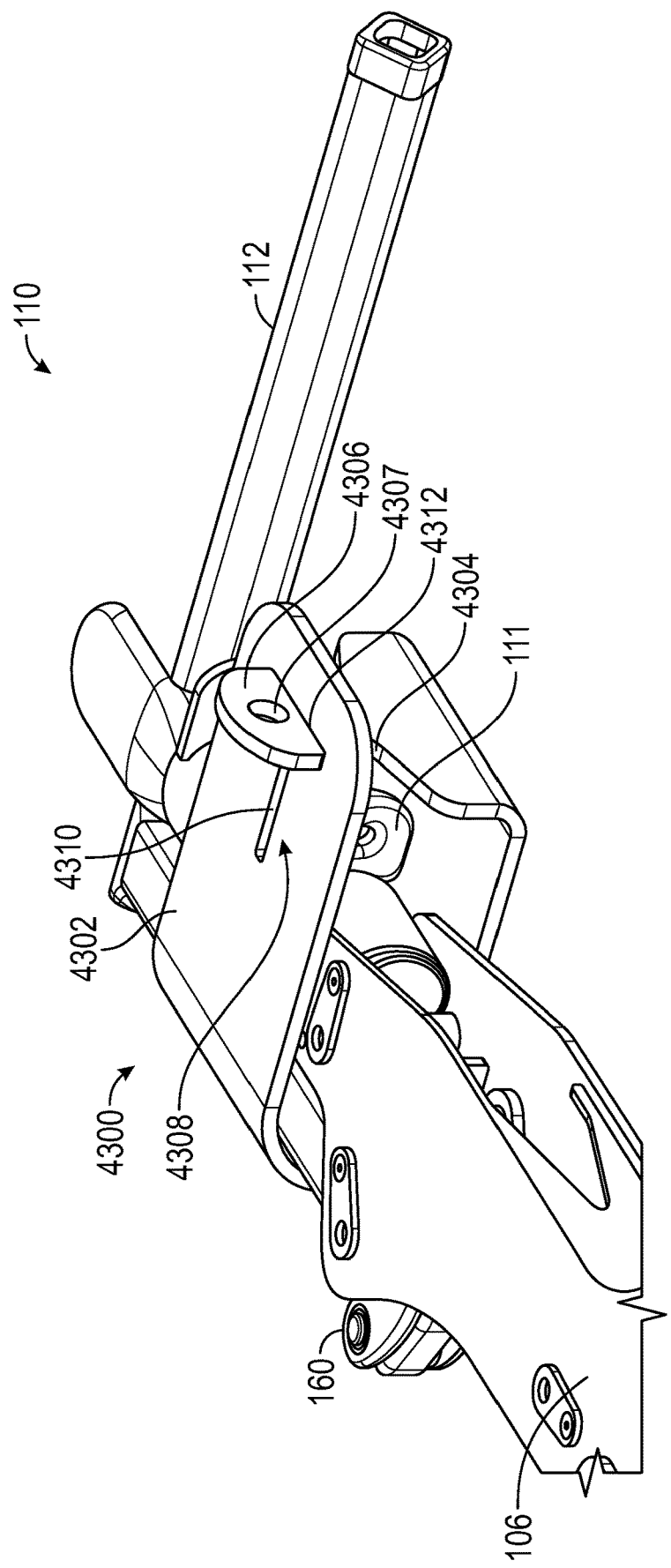
FIGS. 44 and 45 are perspective views of the wheel grid of FIG. 1, including one of the protective belts of FIG. 17.
Figure 45:
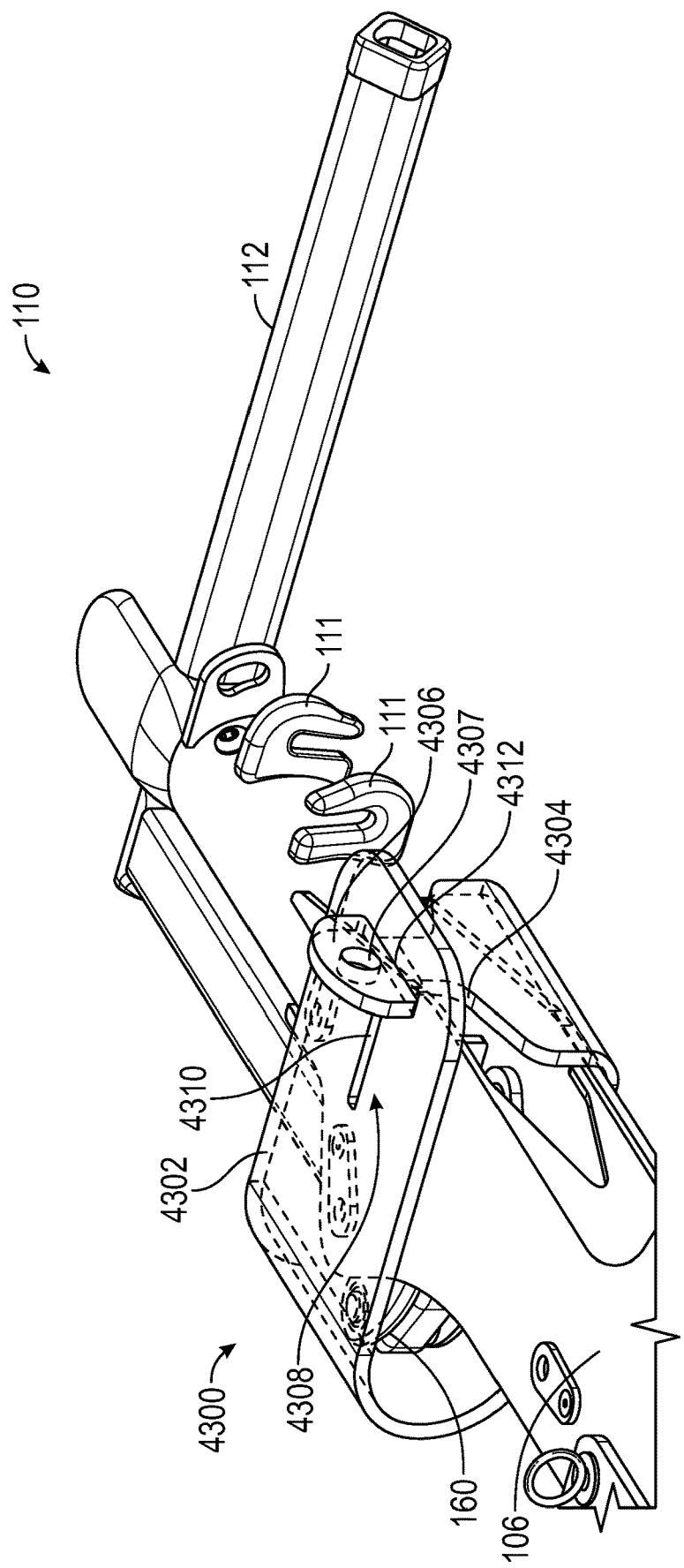

Referring now to FIGS. 43-45, the wheel grid 100 is shown with a protective belt 4300, according to some embodiments. The belt 4300 is positioned around the crossbar 106 and provides a barrier between the crossbar 106 and the bumper 4402 of the towed vehicle 4400. The belt 4300 may be made of a flexible, relatively soft material that may reduce scratches, dents, and other damage to the bumper 4402 that may occur if the bumper 4402 directly contacted the crossbar 106. For example, the belt 4300 may be made from a rubber, plastic, or composite material. The material may also be selected to provide a non-slip surface so that the bumper 4402 does not slide across the crossbar 106, which may further reduce the damage to the bumper. The belt 4300 may also protect the wheel grid 100 itself. For example, as shown in FIG. 45, the belt 4300 may be positioned around the L-arm actuator linkages 160, protecting the linkages 160 as well as the crossbar 106 itself from damage caused by lifting the bumper 4402.

When a vehicle 4400 requires a chain lift (e.g., due to damage to the tires 4404), the L-arms 112 are rotated into the stowed position, as shown in FIGS. 43-45. A belt 4300 is then installed on each side of the crossbar 106. The belt 4300 includes an elongated body 4302 long enough to wrap around the crossbar 106. The belt 4300 further includes a narrow portion 4304 that widens to a tab 4306 at one end of the belt 4300. At the other end of the belt 4300 is a slot 4308 sized to receive and retain the tab 4306. The slot 4308 may be, for example, a T-shaped slot with a vertical portion 4310 and a horizontal portion 4312. To install the belt 4300 on the crossbar 106, the belt 4300 is first positioned around the chain hooks 111 near an outer end of the crossbar 106, as shown in FIG. 44. In this area, the crossbar 106 may be relatively narrow, allowing for more room to install belt 4300. Next, the tab 4306 is inserted into the vertical portion 4310 of the slot 4308 by turning the tab 4306 end of the belt 4300 ninety degrees from its natural position. Because of the shape and flexible material of the belt 4300, a user may rotate the tab 4306 by hand. Once the tab 4306 has been fully inserted, the tab 4306 may be rotated ninety degrees back to its natural position, and the narrow portion 4304 may be moved into the horizontal portion 4312 of the slot 4308. Because the tab 4306 is wider than the horizontal portion 4312 of the slot 4308, the tab 4306 cannot be pulled through the horizontal portion 4312, and the belt 4300 is retained around the crossbar 106. Finally, the belt 4300 can be slid toward the center of the crossbar 106 into an installed position around the linkages 160, as shown in FIG. 45. Because the crossbar 106 is wider in this position, the belt 4300 may fit snugly around the crossbar and be held in place by friction. A second belt 4300 may be installed on the other end of the crossbar 106.

Once the belts 4300 are in the installed position, the tow vehicle can back the wheel grid 100 up to a towed vehicle until the crossbar is roughly aligned with the bumper. Then, a user can install the chain 4320 by coupling a first end of the chain 4320 to the hooks 111 on a first side of the crossbar 106, coupling the chain 4320 to the axle or other structural component of the towed vehicle, and coupling the other side of the chain 4320 to hooks 111 on the other side of the crossbar 106. In some embodiments, separate chains 4320 may be used on each side of the crossbar 106. Once the chains 4320 are installed, the wheel grid 100 can be lifted, causing the chains 4320 to lift the vehicle 4400. As shown in FIG. 43, the belts 4300 separate the bumper 4402 of the towed vehicle 4400 from the wheel grid, protecting the bumper 4402, the crossbar 106, and the linkages 160 from damage. To remove the belt 4300, the process is reversed. The vehicle is lowered to the ground and the chains 4320 are removed. The belts 4300 are slid toward the end of the crossbar, and the tab 4306 is turned ninety degrees and pulled back through the vertical portion 4310 of the slot 4308. The tab 4306 may include an opening 4307 that can be used to pull the tab 4306 when installing or removing the belt 4300 or can be used to hook the belt 4300 in a storage location.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data that cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the wheel grid 100 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A wheel grid comprising:
a crossbar configured to be coupled to a main boom of a wheel lift tow vehicle;
a first L-arm rotatably coupled to the crossbar at a first pivot point, the first L-arm comprising a first extension member and a first wheel brace member, the first wheel brace member configured to engage a first tire of a towed vehicle when the first L-arm is in an engaged position; and
a first crossbar end coupled to a first side of the crossbar, wherein the first L-arm is configured to rotate from the engaged position into a stowed position in which the first wheel brace member contacts and displaces the first crossbar end.

2. The wheel grid of claim 1, wherein:
a proximal end of the first extension member is rotatably coupled to the crossbar;
a distal end of the first extension member is coupled to a proximal end of the first wheel brace member; and
the first wheel brace member extends substantially perpendicularly away from the first extension member.

3. The wheel grid of claim 2, wherein in the stowed position, the first extension member is positioned substantially parallel and adjacent to the crossbar and the first wheel brace member extends in a direction substantially perpendicular to the crossbar.

4. The wheel grid of claim 3, further comprising a linear actuator coupled to one or more linkages, the linear actuator and the one or more linkages configured to rotate the first L-arm approximately 180 degrees from the stowed position to a loading position.

5. The wheel grid of claim 1, wherein the first crossbar end is slidably coupled to the crossbar, the rotation of the first L-arm into the stowed position causing the first crossbar end to slide towards a center of the crossbar.

6. The wheel grid of claim 5, further comprising a spring configured to bias the first crossbar end away from the center of the crossbar in the direction of the first side of the crossbar.

7. The wheel grid of claim 6, further comprising a retaining rod configured to restrict the movement of the first crossbar end in the direction of the first side of the crossbar.

8. The wheel grid of claim 7, wherein the first crossbar end comprises an inner cylinder and wherein the retaining rod is configured to extend into the inner cylinder when the first crossbar end slides toward the center of the crossbar.

9. The wheel grid of claim 5, wherein the crossbar comprises a tube and wherein the first wheel brace member is configured to push the first crossbar end into the tube when the first L-arm rotates into the stowed position.

10. The wheel grid of claim 1, wherein the first crossbar end is pivotably coupled to the crossbar, the rotation of the first L-arm into the stowed position causing the first crossbar end to rotate relative to the crossbar.

11. The wheel grid of claim 10, wherein the first wheel brace member is configured to rotate the first crossbar end such that the first crossbar end rests on an upper surface of the first wheel brace member when the first L-arm is in the stowed position.

12. The wheel grid of claim 11, wherein the first crossbar end comprises an angled portion and wherein the first wheel brace member is configured to contact the angled portion before contacting any other portion of the first crossbar end when the first L-arm is rotating into the stowed position.

13. The wheel grid of claim 10, wherein the first crossbar end includes a mounting bracket positioned in an opening in the crossbar and rotatably coupled to the crossbar by a pin; wherein the pin and a lower surface of the opening are configured to cooperatively support the first crossbar end in a substantially horizontal orientation when the first L-arm is in the engaged position.

14. The wheel grid of claim 10, wherein:
a proximal end of the first extension member is rotatably coupled to the crossbar;
a distal end of the first extension member is coupled to a proximal end of the first wheel brace member; and
the first wheel brace member extends substantially perpendicularly away from the first extension member,
wherein in the stowed position, the first extension member is positioned substantially parallel and adjacent to the crossbar and the first wheel brace member extends in a direction substantially perpendicular to the crossbar.

15. A wheel grid comprising:
a crossbar configured to be coupled to a tow vehicle;
a wheel engagement member rotatably coupled to the crossbar; and
a wheel support coupled to the crossbar, the wheel support and the wheel engagement member configured to cooperatively engage a tire of a towed vehicle when the wheel engagement member is in a first position,
wherein the wheel engagement member is configured to rotate from the first position into a second position, the rotation causing the wheel support to move from a third position to a fourth position.

16. The wheel grid of claim 15, wherein the wheel support is slidably or rotatably coupled to the crossbar and contact between the wheel engagement member and the wheel support causes the wheel support to slide or rotate into the fourth position.

* * * * *